US005319560A

United States Patent [19]

Adams et al.

[11] Patent Number: 5,319,560
[45] Date of Patent: Jun. 7, 1994

[54] ANALYSIS SYSTEM FOR DATABASE FUSION, GRAPHIC DISPLAY, AND DISAGGREGATION

[75] Inventors: Mark S. Adams, Ft. Smith, Ark.; William Heyman, Garland; Joseph J. Zentner, Plano, both of Tex.

[73] Assignee: Rockwell International Corporation, Seal Beach, Calif.

[21] Appl. No.: 760,024

[22] Filed: Sep. 11, 1991

[51] Int. Cl.[5] ............ G06F 15/21
[52] U.S. Cl. ............ 364/439; 364/436; 364/437; 364/444; 364/449; 364/478; 395/600; 340/993
[58] Field of Search ............ 364/437, 436, 444, 449, 364/443, 478, 439; 340/991, 993, 905; 395/600

[56] References Cited

U.S. PATENT DOCUMENTS

| | | | |
|---|---|---|---|
| 4,823,271 | 4/1989 | Clark et al. | 364/443 |
| 5,043,908 | 8/1991 | Manduley et al. | 364/478 |
| 5,072,400 | 12/1991 | Manduley | 364/478 |
| 5,122,959 | 6/1992 | Nathanson et al. | 364/436 |
| 5,157,783 | 10/1992 | Anderson et al. | 395/600 |
| 5,164,904 | 11/1992 | Sumner | 364/436 |
| 5,173,691 | 12/1992 | Sumner | 340/905 |

*Primary Examiner*—Thomas G. Black
*Assistant Examiner*—Stephen J. Walder, Jr.
*Attorney, Agent, or Firm*—V. Lawrence Sewell; M. Lee Murrah; H. Fredrick Hamann

[57] ABSTRACT

An analysis system fuzes original data according to system and/or operator imposed rules, displays a graphic abstraction representing fuzed data, and provides, merely at the operator's request, details of the fuzed data and/or of the original data.

17 Claims, 9 Drawing Sheets

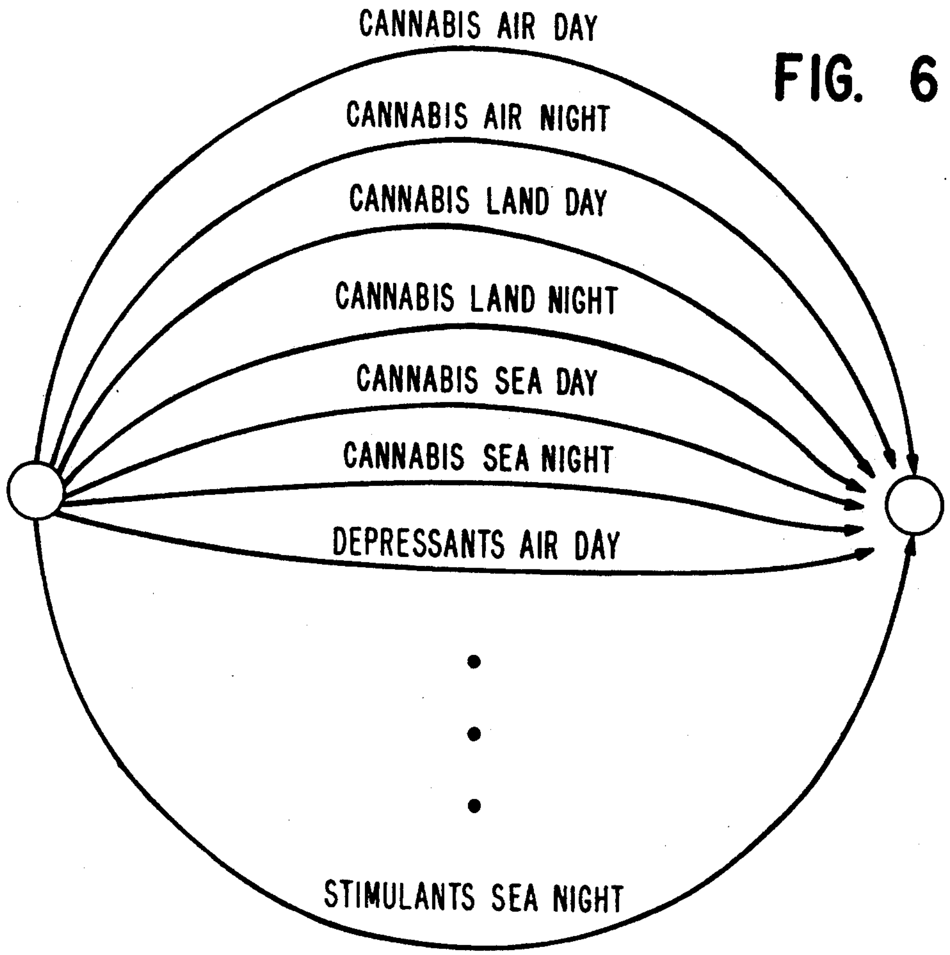
FIG. 6
FIG. 7
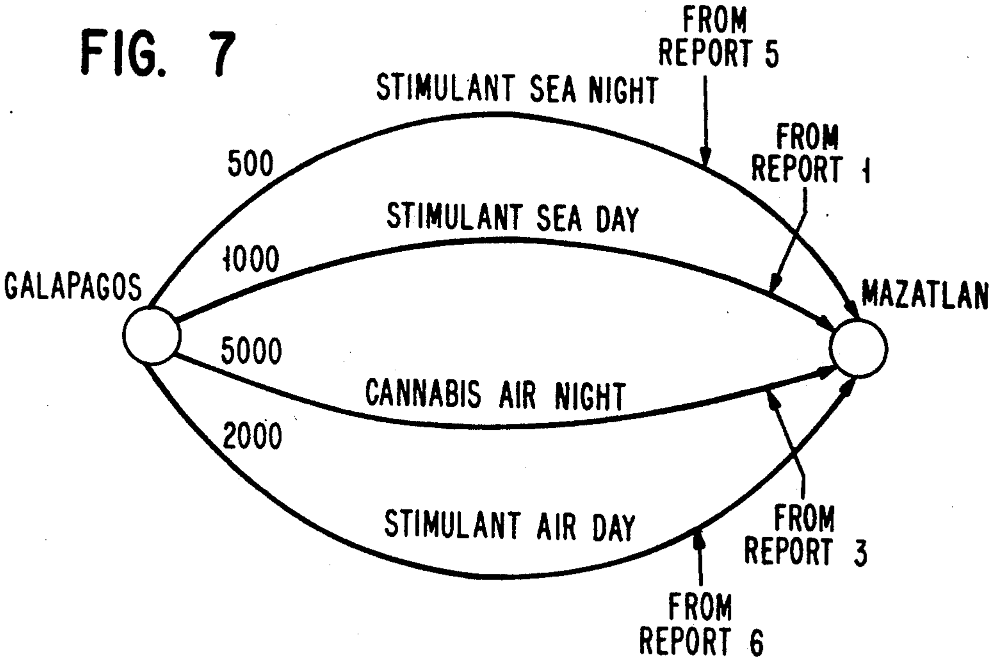

ANALYSIS SYSTEM FOR DATABASE FUSION, GRAPHIC DISPLAY, AND DISAGGREGATION

BACKGROUND OF THE INVENTION

This invention relates to summary statistics (i.e., simplified representations of the general characteristics of a large set of data) and to recovering details on the individual facets from which the efficient summary statistics were computed.

SUMMARY OF THE INVENTION

In the preferred application of the methodology and apparatus presented herein, a law enforcement person (who may or may not be computer literate) may perceive patterns in illegal drug flows. Typically, drug enforcement databases contain data in sufficient amounts to overwhelm an analyst. If all known drug-related locations and routes were directly depicted, they would blur together, yielding an inundation of detailed data, but no usable information.

Our system allows the analyst to fuze data into desired categories and view the fuzed data to perceive patterns. The analyst may query the pattern for certain details of the fuzed data and/or the analyst may decompose/disaggregate selected parts of the pattern and follow an audit trail back to the original records. First, the analyst accesses different reports or databases of reports to assemble data into one database. The selected data, which may include smuggler identity and resources, name and quantity of illegal drugs, locations, and interdictor identity and resources, are fuzed into a network of nodes and arcs. The nodes represent locations of drug origin, transshipment and destination. The arcs represent transportings (via air, sea, land) between nodes. Using analyst-defined criteria for geographic proximity, time intervals, drug types, etc., the system fuzes the data into an abstract network of nodes and arcs that is displayed against a map background on a computer graphics terminal.

The fuzed abstraction of nodes and arcs, when displayed graphically, allows the perception of patterns. For an analyst to sequentially search through a large database and mentally relate similar characteristics in the reports would be an impossibility. Prior art database extraction or compression schemes do not generate such an abstraction.

Next, the analyst may designate any of the nodes or arcs with a computer graphics pointing device to display the aggregate record that makes up the node-arc set. The analyst may further display the individual database records that were originally fuzed to make up the displayed node-arc set. Prior art database manipulation systems that take data and fuze or otherwise sum, average, compile, etc. do not allow the non-computer-literate analyst to reverse the process to decompose or otherwise follow an audit trail back to the original data. Our process not only transforms the original data into an abstract network of nodes and arcs, it also allows the analyst to use the node-arc set as a graphic guide back to the aggregate data that made up the node-arc set and to recover the individual reports that made up the abstraction.

BRIEF DESCRIPTION OF THE DRAWINGS

These and other features, objects, and advantages of the invention ill become more apparent upon reference to the following specification, claims, and appended drawings in which:

FIGS. 6 and 7 are representations of a node pair and sub-arcs and are useful in explaining an aspect of the invention;

DETAILED DESCRIPTION OF A PREFERRED EMBODIMENT

INTRODUCTION TO THE CONCEPT: A SIMPLIFIED EXAMPLE

Figure 1:
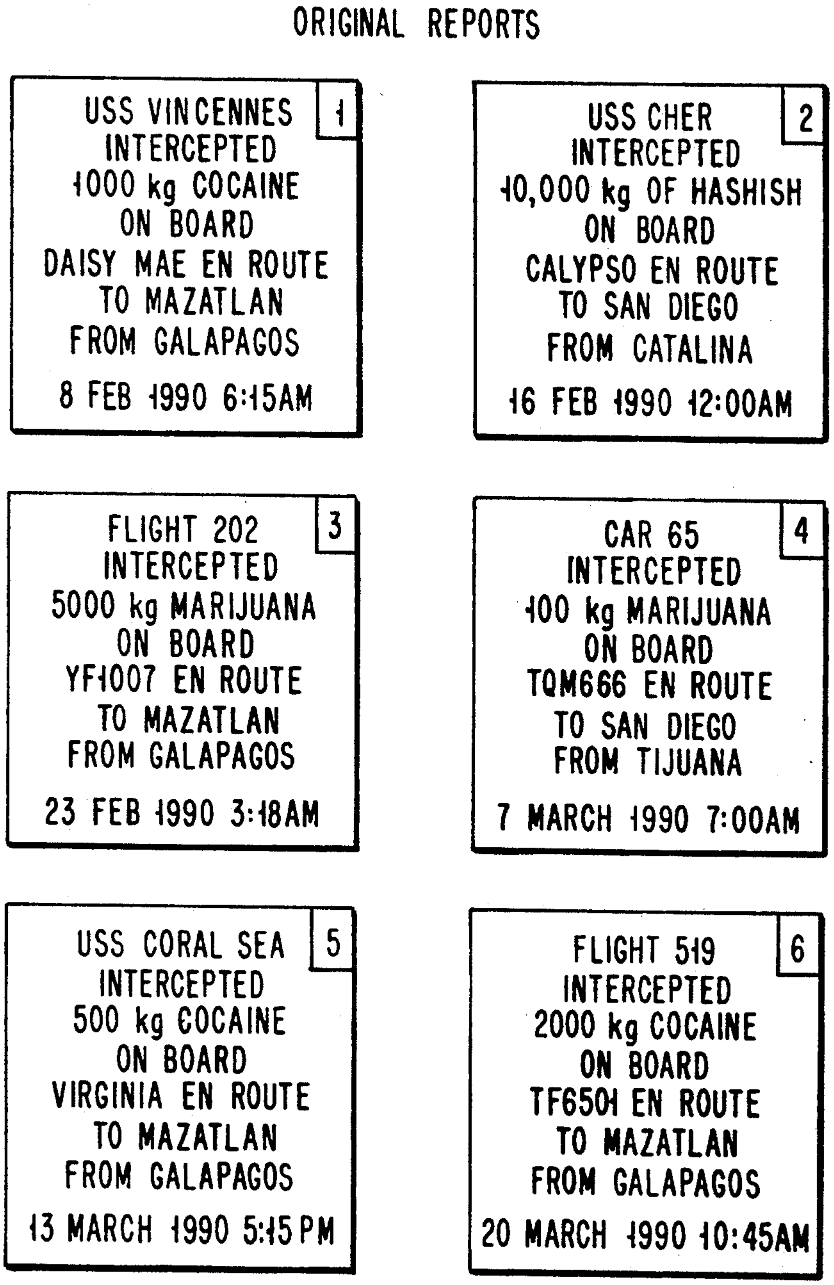
FIG. 1 is a simplified representation of reports of drug intercepts.

FIG. 1 represents six typical original reports of drug intercepts. Each report includes the name of drug intercepted, how much intercepted, origin of the transporting, destination, indication of transport means, time of day intercepted, day, and indication of the intercepting entity. Six fields of this information on each report are entered into a system database so that there are six records having six entries each. Table A is representative of such database and of the correspondence between reports and records.

TABLE A

| DATABASE | | | | | | Original |
|---|---|---|---|---|---|---|
| Origin | Destination | Amount | Drug | Mode | Time | Report Number |
| GAL | MAZ | 1,000 | cocaine | sea | 6:15 AM | 1 |
| GAL | MAZ | 5,000 | marijuana | air | 3:18 AM | 3 |
| GAL | MAZ | 500 | cocaine | sea | 5:15 PM | 5 |
| GAL | MAZ | 2,000 | cocaine | air | 10:45 AM | 6 |
| CAT | SD | 10,000 | hashish | sea | 12:00 AM | 2 |
| TIJ | SD | 100 | marijuana | land | 7:00 AM | 4 |

The system maps each drug into one of five drug types or classes, and maps the time of day into one of two twelve-hour intervals. In the time mapping, all times between 0600–1759, inclusively, are translated to "day", and all other times are translated to "night". The mapping of drugs into types is represented in Table B.

TABLE B

| Drug Name | Drug Type/Class |
|---|---|
| cannabis | cannabis |
| hashish | cannabis |
| hemp | cannabis |
| marijuana | cannabis |
| depressants | depressants |

TABLE B-continued

| Drug Name | Drug Type/Class |
|---|---|
| hallucinogens | hallucinogens |
| heroin | narcotics |
| morphine | narcotics |
| narcotics | narcotics |
| cocaine | stimulants |
| stimulants | stimulants |

Figure 2:
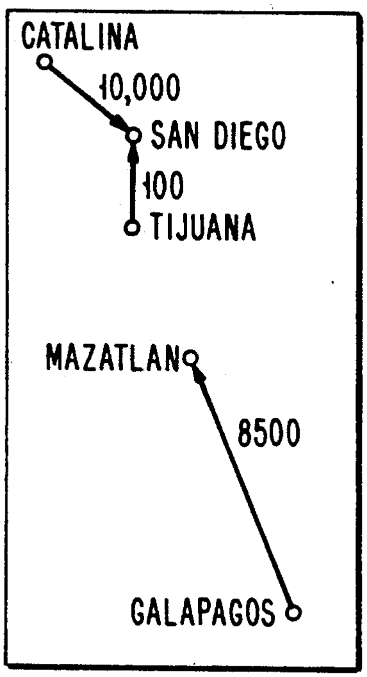
FIGS. 2 through 5 are simplified examples of displays that are useful in explaining an aspect of the invention.

The system will provide the operator, on a CRT, a display of location-meaningful nodes and arcs similar to that represented in FIG. 2. The FIG. 2 illustration assumes that no "filtering" has been accomplished. (More about "filtering" will follow hereinbelow.) The nodes in FIG. 2 indicate the different origins and destinations, and the arcs indicate which nodes are paired as shipment origin and destination. A single arc is displayed between Galapagos and Mazatlan, although four shipments were intercepted along this path. Alongside each arc is a displayed number indicating the total amount of drugs intercepted between the associated origin-destination pair.

Figure 3:
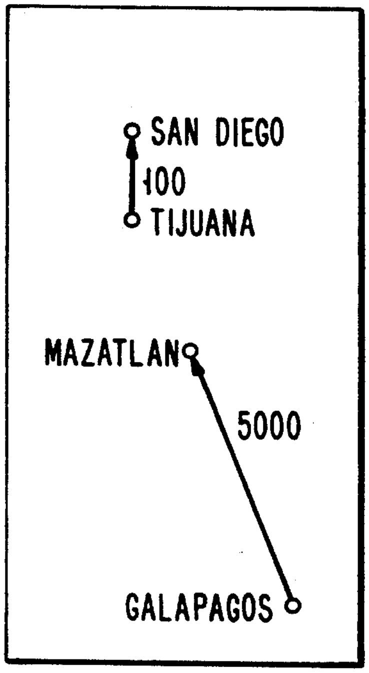

In FIG. 2, all six records, and thus all six reports, contribute to the display (four of these reports contributing to the path between Galapagos and Mazatlan) but the operator can filter by requesting only specific ones (rather than all) of the three modes, five types, and two twelve-hour intervals. For example, if the operator specifies (cannabis) (air and land) (day and night)

the display will change to one similar to that represented in FIG. 3 wherein the only reports contributing to the display are reports 3 and 4. No Catalina node is displayed and no Catalina to San Diego arc is displayed because, in report 2, the mode is "sea" and the operator has specified only "air and land". The amounts in reports 1, 5, and 6 are not reflected in the Galapagos to Mazatlan arc because the drug in such reports is "stimulants", not the operator-specified "cannabis".

Figure 4:
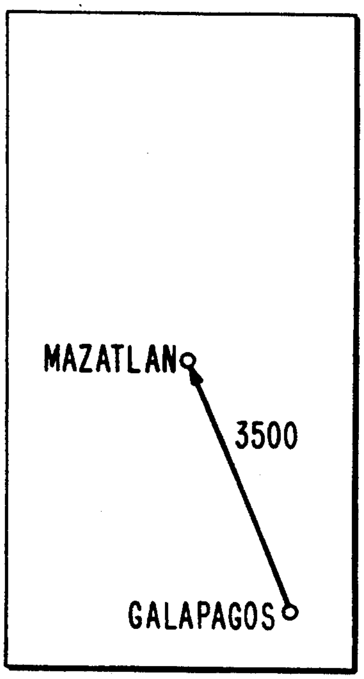

As a further example, if the operator specifies (stimulants) (air and sea) (day and night)

the display will be similar to that represented in FIG. 4 wherein the only reports contributing to the display are reports 1, 5, and 6. No Catalina, San Diego, or Tijuana nodes (and no arcs therebetween) are displayed because reports 2 and 4 are for "cannabis", not "stimulants" as specified by the operator. Similarly, the report 3 for cannabis is not reflected in the amount alongside the Galapagos to Mazatlan arc because the operator has specified only "stimulants".

Figure 5:
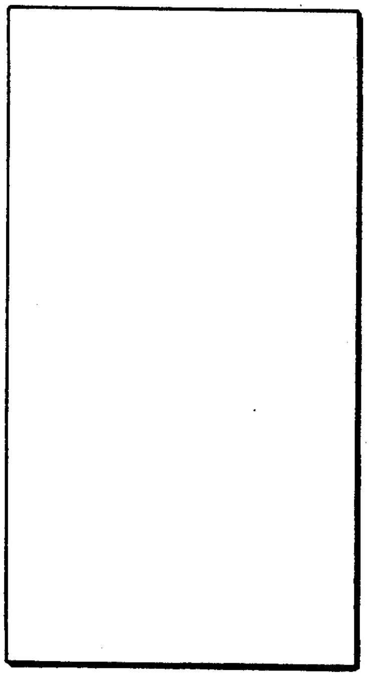

As a further example, if the operator specifies (stimulants) (air) (night)

the display will be similar to that represented in FIG. 5 wherein no nodes or arcs are displayed because none of the six reports meets all three specifications. Reports 2, 3 and 4 are not "stimulants". Reports 1 and 5 are not "air", and report 6 is not "night".

The system also allows the operator to probe into the composition of a particular arc. Say, for example, that the operator is viewing a FIG. 2 display and wants to know more about the Galapagos to Mazatlan arc. The system, upon request by the operator, will display a first level of greater detail, namely: the various drug types that make up the arc of interest and the total amounts of each type, the amount of each drug type intercepted during day and the amount during night, the amount of each drug type transported via air, the amount via land, and the amount via sea. That is, the system would display the information that the Galapagos to Mazatlan arc represents 5,000 units of cannabis and 3,500 units of stimulants, that the cannabis amount via air is 5,000, via land is 0, and via sea is 0, that the cannabis amount during the day is 0 and the cannabis amount during night is 5,000, that the stimulant amount via air is 2,000, via land is 0, via sea is 1,500, that the stimulant amount during the day is 3,500 and the stimulant amount during the night is 0.

The system, upon request, will also display a greater level of detail, namely: all four Galapagos to Mazatlan records shown in Table A, including all six entries in each such record.

Each display, illustrated in FIGS. 2 through 5, depicts fuzed information or fuzed data whose qualities, as a graphic comprising a node-arc network, permit the operator to perceive patterns. Filtering, as the term is used herein, may be analogized to undisplaying certain information. The first level of probing for more information about an arc is accomplished via accessing a fuzed database, and the more detailed level of probing, i.e., disaggregation, is accomplished by automatically re-computing, using the rules of aggregation/fusion, those records in the original database that contributed to the fuzed arc of interest.

These principles may be additionally addressed with the aid of FIGS. 6 and 7. As suggested by FIG. 6, each fuzed arc may be thought of as 30 sub-arcs. That is, since there are five types, three modes, and two twelve-hours intervals, there are $5\times3\times2=30$ possible combinations and thus, conceptually, thirty sub-arcs. The display of all 30 conceptual sub-arcs is precluded, due to the cluttering effect on a small screen. In the instance represented by FIG. 2, the fuzed arc from Galapagos to Mazatlan may be considered, as represented in FIG. 7, as being made up of (i) 26 sub-arcs of zero contribution, i.e., zero amounts of drugs and (ii) 4 sub-arcs of non-zero contribution.

When the operator filters, he is in effect saying: Display only those arcs that have non-zero sub-arcs amongst the sub-arcs that are being specified. For example, when the operator specifies (stimulants) (air) (night)

as in the FIG. 5 example, no arc will appear between Galapagos and Mazatlan because the only non-zero sub-arcs are outside the specification.

Further exemplary, when the operator specifies (stimulants) (air and sea) (day and night)

as in the FIG. 4 example, an arc will appear between Galapagos and Mazatlan because at least one sub-arc is within the specification. In such an example, there are actually three sub-arcs within the specification and these three sub-arcs are the ones corresponding to reports 1, 5, and 6. The total of amounts in reports 1, 5, and 6 is 3,500 units and thus such number is displayed as indicated in FIG. 4.

The system always knows what filters have been specified and also knows the mappings; e.g., the drug to type mapping, and the precise time to twelve-hour interval mapping. Thus, whenever the operator requests disaggregation, the proper query can be constructed, by the system, based on the currently specified filtering parameters, and the mappings between the original report fields and the fuzed database fields.

Therefore, for example, if the operator requests disaggregation of the Galapagos to Mazatlan arc depicted in FIG. 4, there would be displayed records corresponding to reports 1, 5, and 6, but no records corresponding to reports 2, 3, or 4.

A REPRESENTATIVE EXAMPLE OF WHAT THE PREFERRED SYSTEM CAN ACCOMPLISH

Appendix I included herein is a source code listing of the presently preferred computer program and reflects the system operation with an original database of several hundred records. Typically, the original database will contain several thousand records constructed from a like number of drug intercept reports. Also typically, the analyst will select a time frame of reports for his/her analysis; e.g., the last three months, or the last year, etc. In the Appendix I implementation, each record has six fields and each field contains an entry that is one of a plurality of possible entries in such field. The six fields of each record are (1) origin of the drug shipment (2) destination of the drug shipment (3) name of the drug or substance intercepted (4) time of intercept (5) mode of shipment of the substance and (6) amount of substance intercepted. The origin fields have several different entries, i.e., several different cities. The destination fields have several different entries/cities. Some cities are common to both fields while some are not, and the total number of different cities in the two fields is 25. The drug fields have 11 different entries, and the mode fields have three different entries. Both the time fields and the amount fields have numerous different entries.

This original database is fuzed according to rules imposed by the system and/or the operator into a fuzed database whose records correspond to the non-zero sub-arcs addressed hereinabove in connection with FIGS. 6 and 7. That is, each fuzed database record contains a specific origin-destination pair, a specific twelve-hour interval, a specific mode of transport, a specific drug type or drug class, and a "total" amount reflecting a sum of certain amounts in the original database. Such "total" amount is the amount for the associated sub-arc. Alternatively, such "total" amount may be thought of as follows. Each record in the fuzed database is usually representative of a combination of several records in the original database, because each of five fields in the fuzed database is more generic than the corresponding field in the original database. Whenever two or more records at the "species" level in the original database fall within a "genus" level record in the fuzed database, the amounts of the two or more original database records are summed and entered into the amount field in the fuzed database.

For example, there are three records in the original database having the following entries:

BAH/MIA/300KG/cannabis/air/1200 hours

BAH/MIA/300KG/marijuana/air/1500 hours

BAH/MIA/400KG/hashish/air/1700 hours

As will be elaborated on further hereinbelow, each of these three original database records fall within the fuzed database record whose entries include BAH/MIA/cannabis/air/day and thus the individual amounts of 300, 300, and 400, are summed and the entries in the fuzed database record become BAH/MIA/1,000KG/cannabis/air/day In the fusion process, there is effected a clustering of origins which are sufficiently close to one another (and likewise with destinations), there is effected a clustering or mapping of drug name into type of drug, and there is effected a clustering or mapping of exact time into one of two twelve-hour intervals.

Clustering of drugs is accomplished in accordance with table B shown hereinabove. With respect to time clustering, as is also indicated hereinabove, all times between 0600–1759, inclusively, are mapped to and treated as a twelve-hour interval called "day", and all other times are mapped to and treated as a twelve-hour interval referred to as "night". No mapping or transformation is performed on the mode entries.

In the Appendix I implementation, clustering of cities is accomplished in accordance with the following scheme. The analyst decides on a subset of city names whose corresponding nodes are the only nodes that may be displayed. Each of the remaining city names is clustered with the geographically closest city name in the selected subset. For example, Bay St. Louis (BSL) is clustered with New Orleans (LUX), and Coral Gables (CGA) and Hollywood, Fla. (HWD) are each clustered with Miami (MIA). Following such clustering, an original record that has HWD as the destination entry will be treated by the system as though it had MIA as the destination entry. Similarly, following such clustering, an original record that has BSL as the origin entry will be treated by the system as though it had LUX as the origin entry. Of course, the origins and destinations in the operator selected subset are not changed by the clustering. For example, BAH remains BAH.

Figure 8A:
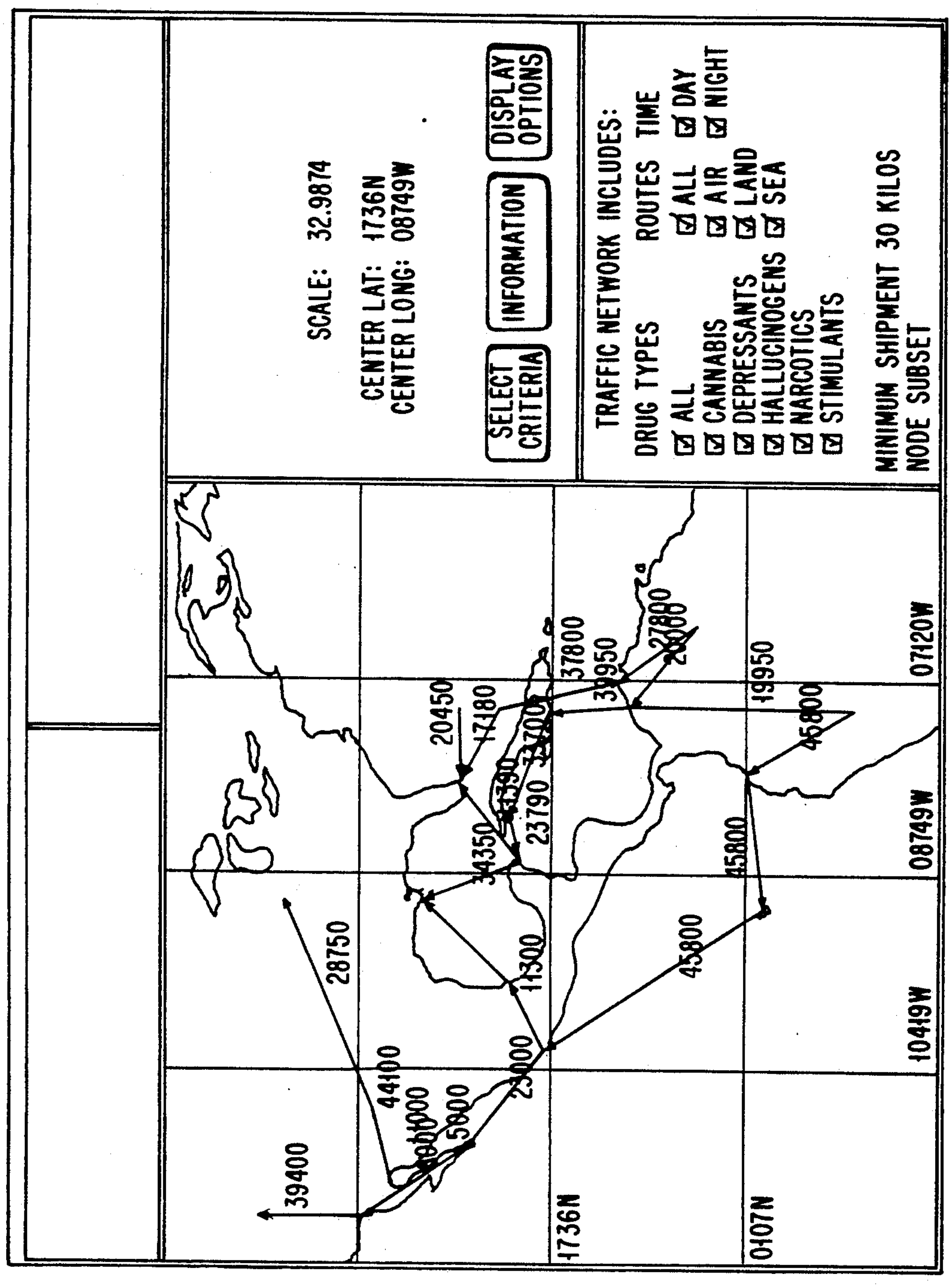
FIGS. 8*a*, 8*b*, 8*c*, and 8*d* are representative of displays achieved in accordance with the presently preferred implementation of the invention.

From the fuzed database, the system creates, on a display screen, a display comprising a network of nodes and arcs superimposed/overlaid on a geographic map. The graphic depicted in FIG. 8*a* is representative of an actual printout of a display screen image created from the fuzed database without any "filtering" applied. That is, all options as to type, mode and twelve-hour interval are selected (checked) in this example and the values of the amount shipped alongside the arcs are at their maximum for this data set. Each arc indicates there was at least one shipment between the associated origin-destination node pair, and the amount adjacent the arc indicates the total amount along such path, irrespective of type, mode, or twelve-hour interval.

For example, the arc and adjacent number 45,800 from Galapagos to the western coast of Mexico is the fuzed representation of the five records in the fuzed database whose entries are:

GLP/MZL/5,800/cannabis/sea/day

GLP/MZL/15,000/narcotics/air/day

GLP/MZL/7,000/narcotics/sea/day

GLP/MZL/4,000/stimulants/air/day

GLP/MZL/14,000/stimulants/sea/day

Note that the sum of the five entries in the amounts fields is 45,800.

If the operator wishes to view, for example, only the air and land routes of day and night smuggling of narcotics and stimulants, he checks the appropriate boxes on the screen, and filtering is accomplished. That is, records in the fuzed database which do not meet the operator-selected criteria do not contribute to the fuzed graphic displayed on the screen. For example, in referring to FIG. 8*b*, when the operator checks narcotics, stimulants, air, sea, day, and night (as shown in the lower right corner of the screen depicted in FIG. 8*b*) the numbers adjacent the arcs can change and arcs can disappear from the display altogether. For the Galapagos to Western Mexico arc, note that the arc-adjacent amount has fallen to 40,000. This is because only four of the five records in the fuzed database meet the operator-selected criteria. The fuzed database record containing 5,800 of cannabis does not qualify, and thus the amount shown adjacent this arc is the sum of the other four amounts, namely, 40,000.

By using a mouse or the like to identify which arc and then making a simple request, the operator can query each arc for the particulars of the fuzed database records that make up each arc. FIG. 8*c* shows the result of requesting more information about the FIG. 8*b* arc from Galapagos to Western Mexico. A data window appears on the right side of the screen and shows that of the 40,000 kilos indicated in FIG. 8*b* as flowing along the Galapagos to Western Mexico route, 22,000 were narcotics and 18,000 were stimulants. The display provides further breakdown of these numbers to show (i) that of the 22,000, all were during the day, 7,000 were by sea, and 15,000 were by air and (ii) that of the 18,000, all were during the day, 14,000 were by sea, and 4,000 by air.

The operator can, via a simple request, probe even deeper into details and retrieve all the original database records that contributed to the particular arc about which the operator wishes to know more. The result, as depicted in FIG. 8*d*, is a new window that the operator can view containing every original database record related to the particular probed arc under the currently selected criteria of drug type and mode of route and twelve-hour interval. The operator can quickly return to the graphic and select other arcs or other criteria and retrieve those original records from the original database. The original information is never lost and is always accessible to the operator through the graphics interface.

The retrieval of these records is accomplishable because the system always knows and remembers the operator selected criteria and the clustering and mapping relationships. Using this information, an appropriate query or series of queries of the records in the original database can be formulated and the original records which qualify under the system-memorized "rules" are ferreted out and displayed.

THE PRESENTLY PREFERRED SYSTEM

Figure 8B:
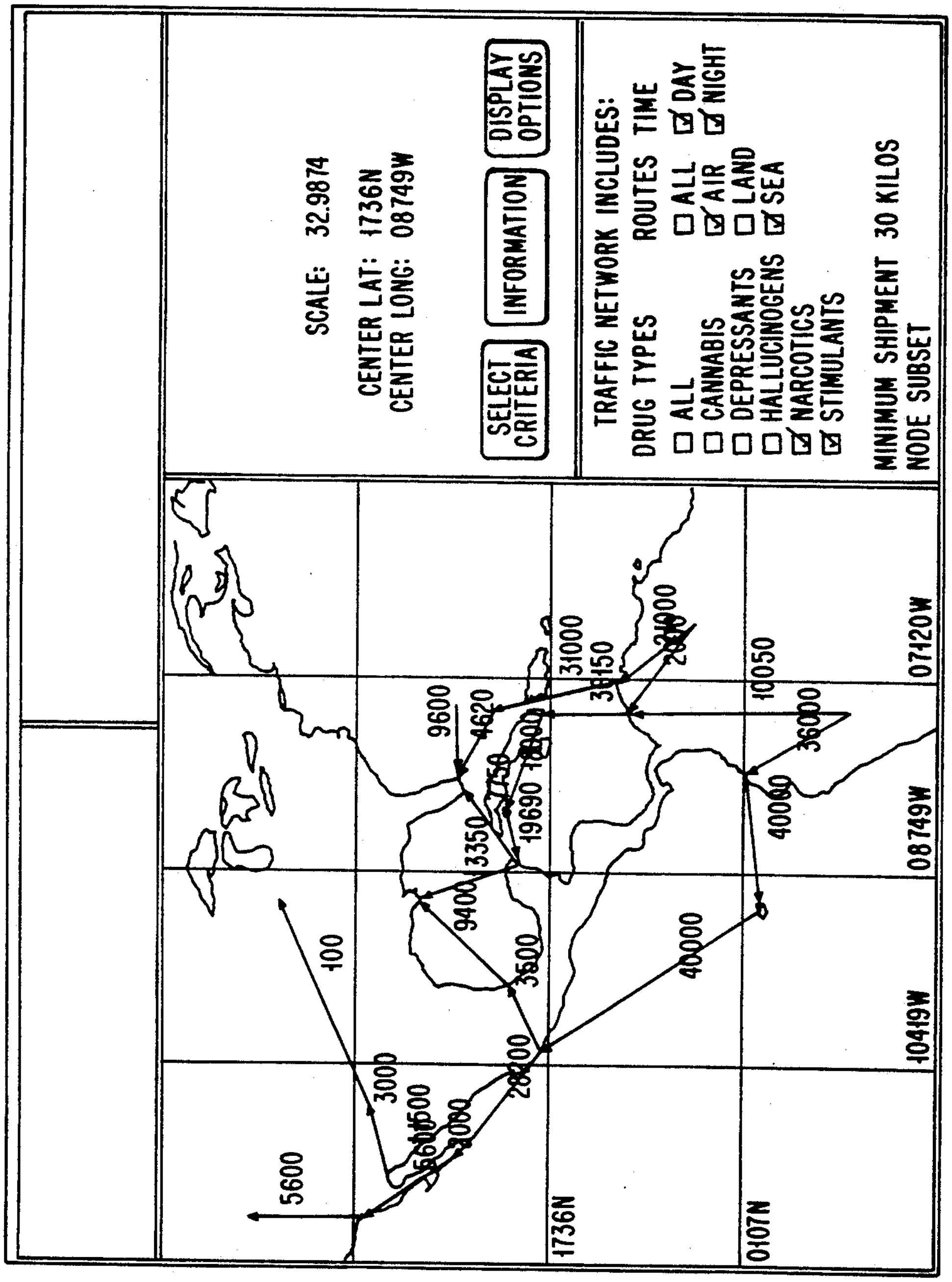
Figure 8C:
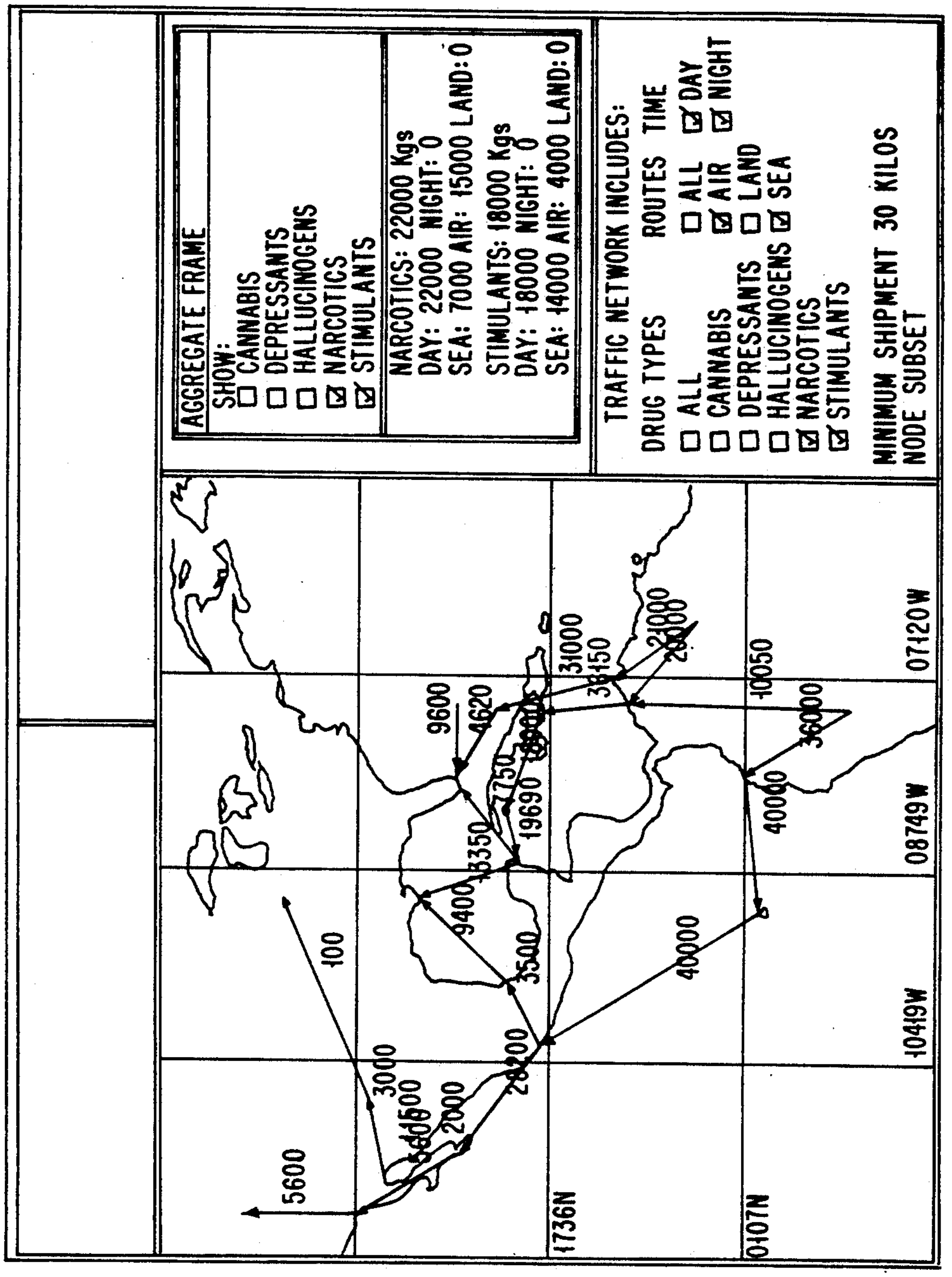
Figure 8D:
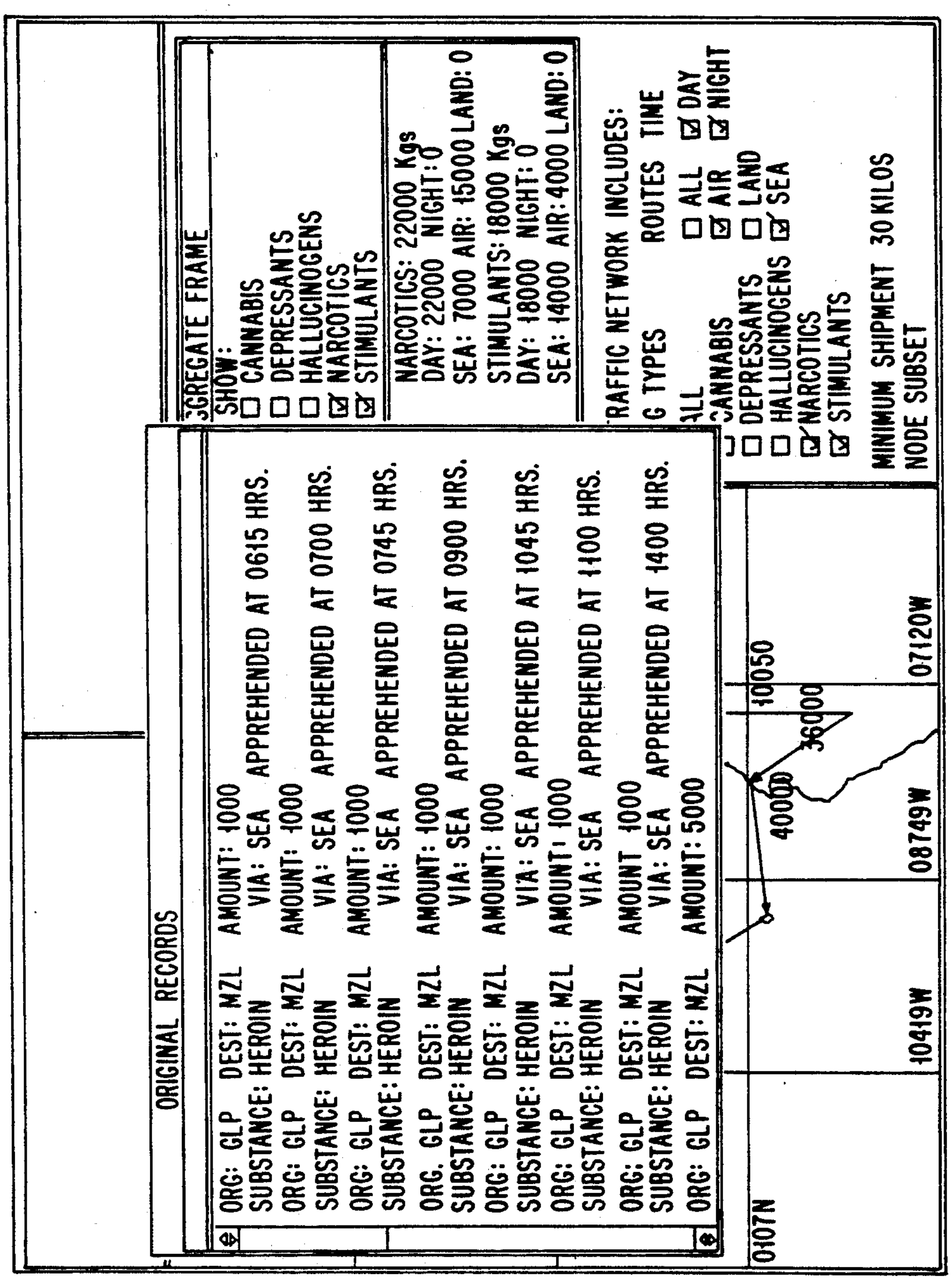
Figure 9:
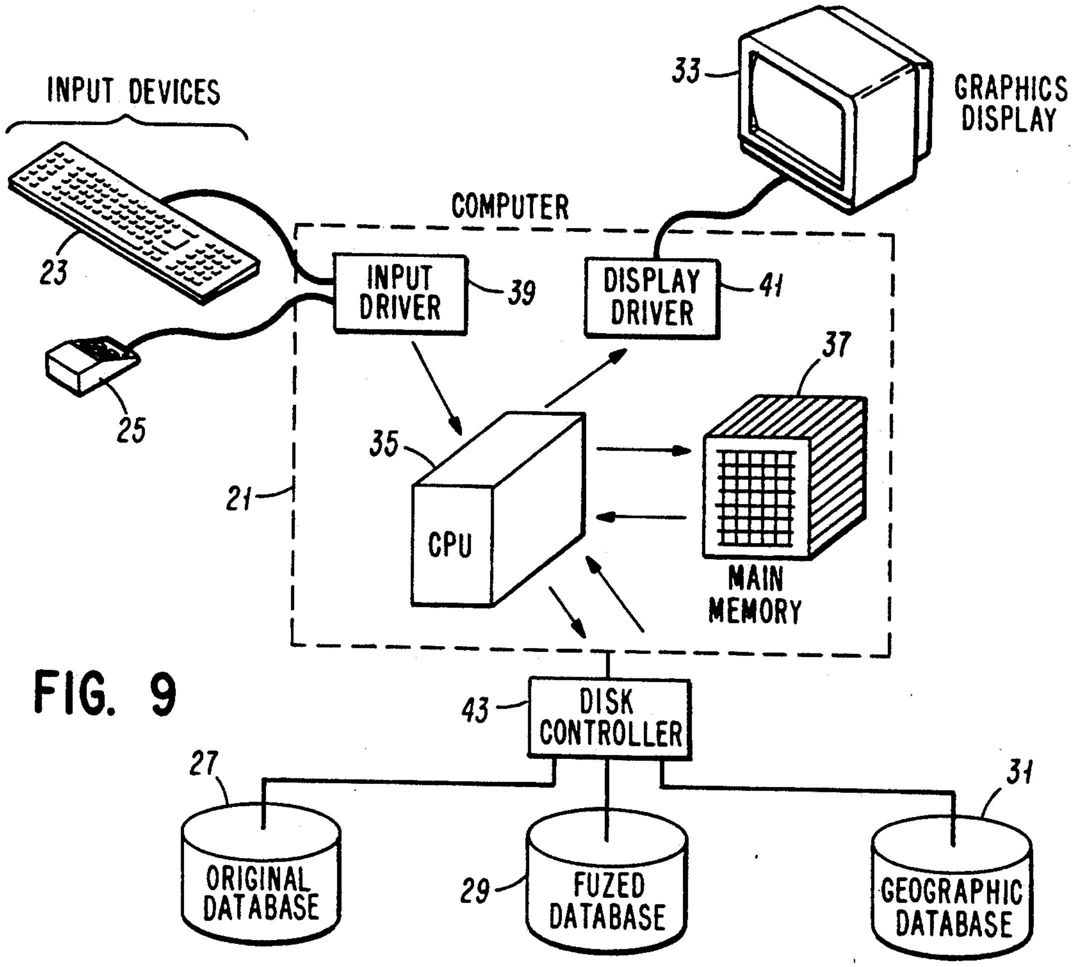
FIG. 9 is a block diagram representing the presently preferred apparatus.

Referring now to FIG. 9, in the presently preferred apparatus a computer 21 receives input from the operator via keyboard 23 and mouse 25, communicates with original, fuzed, and geographic databases 27, 29, and 31, and produces displays, such as those in FIGS. 8*a*–*d*, on the screen of display terminal 33.

The keyboard 23 is used by the operator to enter the information from individual reports, and the original records thereby created are written to and stored in the original database 27. The original database 27 is also read from during fusion and the resulting fuzed records are read to and stored in fuzed database 29. The fuzed database 29 and geographic database 31 are read from in the creation of displays such as those in FIGS. 8*a*–*d*. The original database 27 is also read from in the creation of displays such as that shown in FIG. 8*d*.

The keyboard 23 and/or mouse 25 are used by the operator to enter his requests such as clustering and filtering requests.

The mouse 25 is used by the operator to identify which arc the operator wishes to know more about and thereby aids in determining the content of the windows of information as represented in FIGS. 8*c* and 8*d*.

The computer 21 comprises a CPU 35, a main memory 37, and input and output drivers 39 and 41 respectively. The input driver 39 receives input from devices 23 and 25, and display driver 41 provides output to display terminal 33. Suitable communication, (i.e., command and data linkage) is effected between CPU 35 and input driver 39, between CPU 35 and display driver 41, between CPU 35 and main memory 37, and between CPU 35 and disk controller 43. Disk controller 43 aids in sequencing read and write operations.

Figure 10:
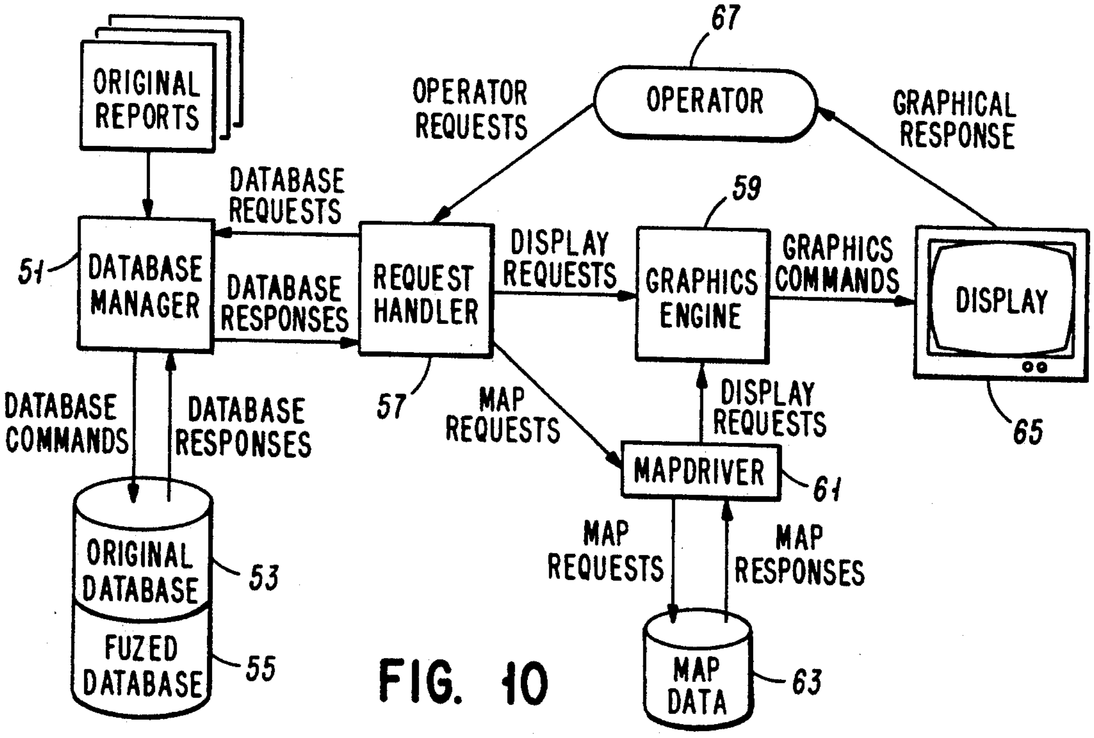
FIG. 10 is a data flow diagram for the presently preferred implementation;.

Referring now to FIG. 10, data flow within the preferred apparatus begins with information, from original reports, being loaded via database manager 51 into original database 53. Database manager 51 also produces fuzed records from the original records and causes the fuzed records to be stored in fuzed database 55. If the operator requests a FIG. 8*a* type of display, request handler 57 issues a suitable request to database manager 51 which retrieves the records in fuzed database 55, accomplishes, for each node pair, the addition of non-filtered non-zero sub-arcs, and responds back to request handler 57 which in turn issues a display request to graphics engine 59 and a map request to map driver 61. Map driver 61 retrieves from map database 63 the data for the map or map portion desired and issues a display request to graphics engine 59.

The two display requests to the graphics engine include sufficient instruction and data for the graphics engine to create image-representative data. Such data is stored in an image memory and converted to commands suitable for driving a display terminal 65 and causing a display to appear thereon.

As the operator 67 views the display 65, the operator may issue a variety of requests to request handler 57. For example, the operator can cause new records, (i.e., information from new reports) to be entered into the original database. Or the operator can issue clustering requests, map display requests, filtering requests, disaggregation requests, arc details requests.

If the operator enters a filtering request, the database response from manager 51 to request handler 57 will not reflect the filtered-out sub-arcs. If the operator queries an arc for greater detail, the database response between manager 51 and request handler 57 will include the non-filtered fuzed records. If the operator requests disaggregation of an arc, the database response between manager 51 and handler 57 will include the non-filtered original records.

Figure 11:
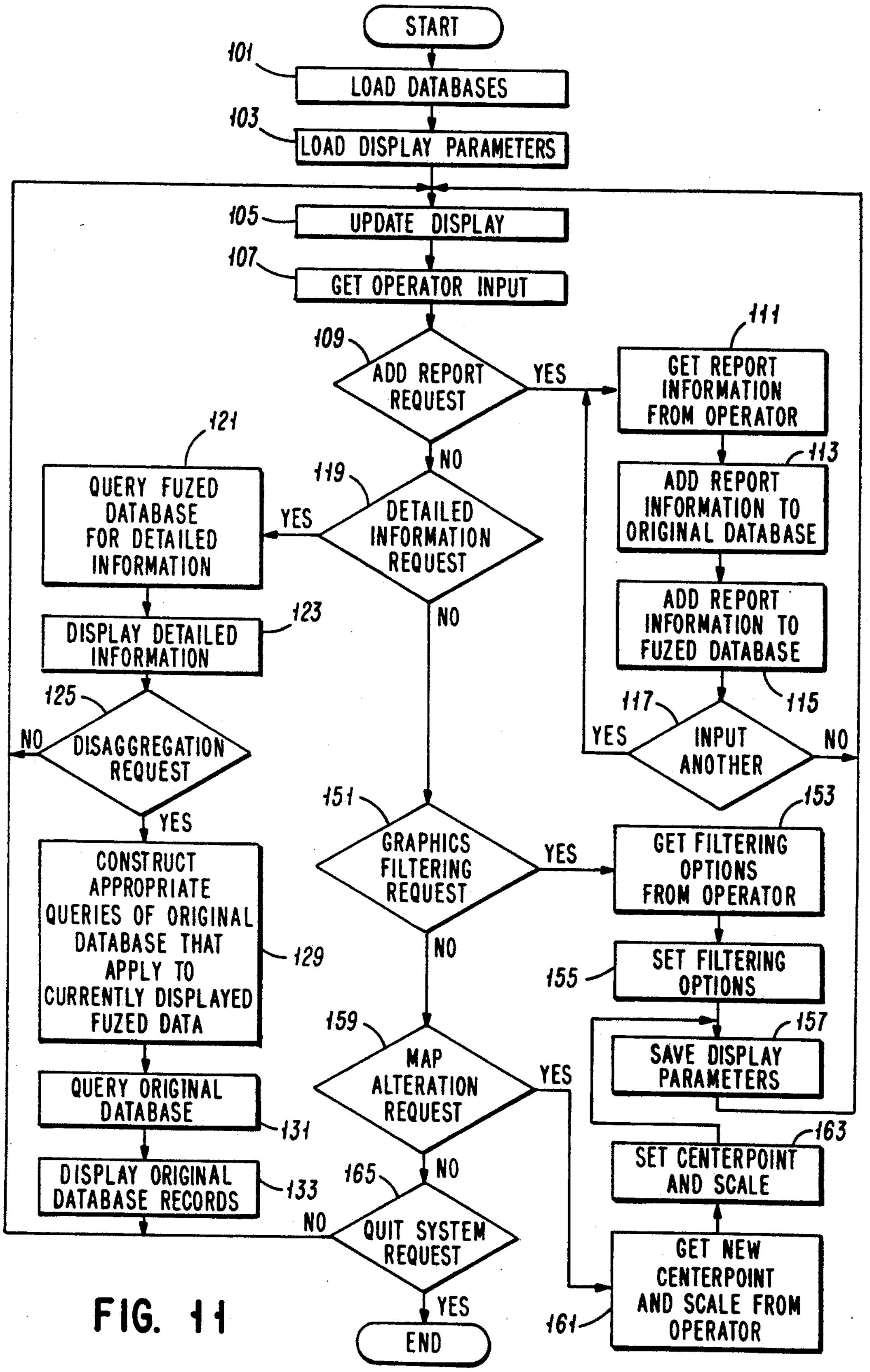
FIG. 11 is a flowchart setting forth various steps in the method.

Referring now to FIG. 11, in the presently preferred method, after start-up, initialization is effected by databases and display parameters being loaded per blocks 101 and 103. Until these loadings are complete, the display screen will typically exhibit a standby or blank screen or comparable indication. Following such loadings, the display is updated, per block 105, to typically exhibit a display comparable to a FIG. 8*a* type of display. Thereafter, the system will make the operator aware, per block 107, that the system is ready to receive operator input.

Block 109 offers the opportunity to add information from a new report. If the operator chooses YES, he enters, per block 111, the six fields of information for which the system is designed, and the system, per block 113, creates and stores a new record in original database 53. Using stored clustering/mapping relationships, the system, per block 115, also creates a new fuzed record and adds same to fuzed database 55. Then the operator, per block 117, can choose to enter information from a second new report. If he chooses YES, blocks 111, 113, and 115 are repeated. If he chooses NO, the display is updated, per block 105, to reflect the newest information; e.g., new node or nodes, new arc or arcs, or changed amount or amounts alongside old arcs, or all or some of these.

After adding new information, the operator, per block 119, can choose to request detailed information as to an arc. If he chooses YES, he identifies an arc and makes the request, per block 121, and the system, per block 123, displays the detailed information by effecting a window of fuzed database details similar to that shown in FIG. 8*c*. Note, however, a YES choice, at block 119, prior to any filtering, will show the information for all non-zero amount drug types associated with the identified arc.

Following block 123, the operator can choose, per block 125, whether to request disaggregation. If he opts NO, the system causes the detailed information to be deleted or undisplayed, leaving the screen similar to that represented in FIG. 8*a* or 8*b*, depending on which display the operator queried in the first place. If the operator chooses YES, the system, per block 129, uses stored clustering/mapping relationships and, if any, filtering choices, and automatically constructs appropriate queries of the original database records that apply to the fuzed records associated with the currently displayed operator-identified arc. The system, per block 131, then queries the original database to ferret out the relevant database records in the original database, and displays, per block 133, such records in a manner similar to that represented in FIG. 8*d*.

Once done with the disaggregation information, the system deletes or undisplays the original database records and the detailed information, and returns the display to the node-arc network type of display represented in FIGS. 8*a* or 8*b*.

Referring now back to block 119, if the operator elects NO, he is presented, per block 151, with the option to request filtering. If he opts YES, the operator, per blocks 153 and 155, makes his choices of drug types, modes, and twelve-hour intervals. The system then, per blocks 155, 157, and 105, sets and stores the options/choices and updates the display accordingly. In this updated display, nodes and arcs may be deleted and/or, as in FIG. 8*b*, shipment amounts alongside some arcs may be reduced in value.

If the operator opts NO at block 151, he is presented, per block 159, with the option to request map alteration. If the choice is yes, the operator then, per block 161, makes his choices of new centerpoint and scale so he can change map portion and/or zoom in or out. The system then, per blocks 163, 157, and 105, sets and stores the new centerpoint and scale and updates the display accordingly.

If the operator opts NO at block 159, he is presented, per block 165, with the option to terminate his use of the system. If he answers no, the system returns to block 105, but since there is nothing new on which to update the display, the display reflects no change and remains as it was. However, the operator can proceed again to certain requests such as the detailed information request of block 119. This is a typical procedure since the operator may want to proceed through all or some of blocks 121 through 137 after having entered his filtering options. This is indeed the sequence reflected by FIGS. 8*a*, 8*b*, 8*c*, and 8*d*. That is, the FIG. 8*b* display is the result of having filtered the FIG. 8*a* display; the FIG. 8*c* display is the result of requesting detailed information about an identified arc in the FIG. 8*b* display; and the FIG. 8*d* display is a result of having requested disaggregation on the same arc identified for the FIG. 8*c* display.

The presently preferred system is implemented with the following: (i) a Sun 3/260 computer, (ii) a 12 megabyte main memory, (iii) a 141 megabyte SCSI hard disc of which 25 megabytes are swap space and 15 megabytes are user space, (iv) Sun Operating System 4.0.3, (v) University INGRES database management system, (vi) Sun C programming language/compiler, (vii) SunCore graphics library, and (viii) SunView graphics library.

Various modifications may be made to the system. For example, instead of going immediately from block 123 to block 125 as shown in FIG. 11, block 123 could lead to a decision block entitled "another detailed information request". The YES choice could lead back to block 121 and the NO choice could lead to block 125. In this manner, the operator could get detailed information on a different arc without first passing through, in sequence, blocks 125, 127, 105, 107, 109 and 119.

As a further example of possible modifications, another decision block could be added which enabled requesting of details as to nodes. Such a block might be added between blocks 119 and 151.

Also, our concept of automatic disaggregation may be applied to other displayed abstractions representing fusion of other kinds of data. For example, assume a car rental agency has locations in five cities, that each location carries several brands of cars, that records are available for all rentals made over the last twelve months, and each record contains city of rental, model/type of car, billing price, date, age, sex and other buyer data, and destination. Assume also that the data is entered in a computer and that through either system and/or operator imposed rules or both, nodes and arcs are created showing origin and destination, and quantities of sales, and mileage for specific conditions imposed by the operator such as "include only May and June", "include only vans", and "include only female renters". For the totals thus displayed for the five cities, the operator might wish to probe a specific node/arc combination to see all records that contributed to the displayed total, perhaps to learn more about the age profile. If our automatic disaggregation capability were included in the computer system, all the operator would have to do would be to make a simple identification and request and the contributing records would be automatically displayed.

Also, quantities displayed on the nodes and arcs may be shown as graphic representation (e.g., bar chart or pie chart) as opposed to the numerals depicted.

Thus, while a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

APPENDIX I

SOFTWARE LISTING

Copyright © 1990, ROCKWELL INTERNATIONAL CORPORATION

All Rights Reserved

SOFTWARE LISTING

Copyright @ 1990, Rockwell International Corporation
All Rights Reserved

```
/*  Entry of Data into the IDEA System  */

/* Analysts would use a menu-driven system to load
data from various agency reports.  This system
would prompt the analyst, as well as query for
information on new data items entered not yet
recognized by the database within IDEA.     */

/* The specific method used to enter the data is
not germane to the data fusion process, so the
first step we start with is a representative
set of data already in the INGRES format stored
in the IDEA database.                        */

INGRES idea

print initialdata

initialdata relation

|origin|destin|amount|substance      |mode  |time |
|-------------------------------------------------|
|BAH   |HWD   |    40|hallucinogens  |air   |  500|
|BAH   |MIA   |   100|cannabis       |sea   | 1400|
|BAH   |MIA   |   200|hashish        |air   |  300|
|BAH   |MIA   |   200|heroin         |sea   | 1300|
|BAH   |MIA   |   200|marijuana      |air   |    0|
|BAH   |MIA   |   200|marijuana      |air   |  100|
|BAH   |MIA   |   200|marijuana      |air   | 2300|
```

| | | | | | |
|---|---|---|---|---|---|
| BAH | MIA | 300 | cannabis | air | 1200 |
| BAH | MIA | 300 | cannabis | air | 200 |
| BAH | MIA | 300 | cocaine | air | 500 |
| BAH | MIA | 300 | hemp | air | 400 |
| BAH | MIA | 300 | marijuana | air | 1500 |
| BAH | MIA | 300 | marijuana | air | 500 |
| BAH | MIA | 300 | marijuana | air | 2200 |
| BAH | MIA | 370 | hallucinogens | air | 200 |
| BAH | MIA | 370 | hallucinogens | air | 300 |
| BAH | MIA | 370 | hallucinogens | air | 400 |
| BAH | MIA | 400 | hashish | air | 1700 |
| BAH | MIA | 400 | stimulants | sea | 550 |
| BAH | MIA | 500 | cannabis | sea | 303 |
| BAH | MIA | 500 | hemp | sea | 404 |
| BAH | MIA | 500 | heroin | air | 1111 |
| BAH | MIA | 500 | heroin | air | 30 |
| BAH | MIA | 500 | heroin | air | 300 |
| BAH | MIA | 500 | morphine | air | 1111 |
| BAH | MIA | 500 | morphine | air | 30 |
| BAH | MIA | 500 | narcotics | air | 30 |
| BAH | MIA | 600 | cocaine | sea | 300 |
| BAH | MIA | 600 | cocaine | sea | 400 |
| BAH | MIA | 600 | cocaine | sea | 500 |
| BAH | MIA | 600 | stimulants | sea | 300 |
| BAH | MIA | 600 | stimulants | sea | 400 |
| BAH | MIA | 600 | stimulants | sea | 500 |
| BAH | MIA | 700 | cannabis | sea | 0 |
| BAH | MIA | 700 | hallucinogens | sea | 300 |
| BAH | MIA | 700 | hallucinogens | sea | 400 |
| BAH | MIA | 700 | hallucinogens | sea | 500 |
| BAH | MIA | 700 | hashish | sea | 202 |
| BAH | MIA | 700 | heroin | sea | 400 |
| BAH | MIA | 700 | marijuana | sea | 1400 |
| BAH | MIA | 700 | marijuana | sea | 1600 |
| BAH | MIA | 700 | marijuana | sea | 101 |
| BAH | MIA | 700 | morphine | sea | 415 |
| BAH | MIA | 700 | narcotics | sea | 430 |
| CAI | MIA | 100 | marijuana | sea | 715 |
| CAI | MIA | 100 | marijuana | sea | 400 |
| CAI | MIA | 150 | marijuana | air | 630 |
| CAI | MIA | 270 | hallucinogens | air | 545 |
| CAI | MIA | 300 | hallucinogens | air | 500 |
| CAI | MIA | 300 | hallucinogens | air | 515 |
| CAI | MIA | 300 | hallucinogens | air | 530 |
| CAI | MIA | 360 | hallucinogens | sea | 555 |
| CAI | MIA | 400 | cannabis | sea | 1200 |
| CAI | MIA | 400 | cannabis | sea | 1500 |
| CAI | MIA | 400 | hallucinogens | sea | 345 |
| CAI | MIA | 400 | hallucinogens | sea | 445 |
| CAI | MIA | 400 | hallucinogens | sea | 545 |
| CAI | MIA | 400 | hashish | sea | 1200 |
| CAI | MIA | 400 | hemp | sea | 1200 |
| CAI | MIA | 400 | heroin | sea | 230 |
| CAI | MIA | 400 | marijuana | sea | 1200 |
| CAI | MIA | 400 | morphine | sea | 230 |
| CAI | MIA | 400 | morphine | sea | 320 |

| | | | | | |
|---|---|---|---|---|---|
| CAI | MIA | 400 | narcotics | sea | 230 |
| CAI | MIA | 500 | depressants | sea | 0 |
| CAI | MIA | 500 | depressants | sea | 100 |
| CAI | MIA | 500 | depressants | sea | 200 |
| CAI | MIA | 500 | depressants | sea | 300 |
| CAI | MIA | 500 | depressants | sea | 400 |
| CAI | MIA | 500 | depressants | sea | 2300 |
| CAI | MIA | 500 | hashish | air | 300 |
| CAI | MIA | 500 | hemp | air | 300 |
| CAI | MIA | 500 | marijuana | air | 300 |
| CAI | MIA | 600 | cannabis | sea | 200 |
| CAI | MIA | 600 | cannabis | sea | 300 |
| CAI | MIA | 600 | cannabis | sea | 400 |
| CAI | MIA | 600 | cocaine | sea | 1 |
| CAI | MIA | 600 | cocaine | sea | 401 |
| CAI | MIA | 600 | cocaine | sea | 505 |
| CAI | MIA | 600 | hashish | sea | 300 |
| CAI | MIA | 600 | hemp | sea | 200 |
| CAI | MIA | 600 | stimulants | sea | 359 |
| CAI | MIA | 600 | stimulants | sea | 2359 |
| CAL | GLP | 800 | marijuana | sea | 500 |
| CAL | GLP | 1000 | heroin | air | 601 |
| CAL | GLP | 1000 | heroin | air | 602 |
| CAL | GLP | 1000 | heroin | air | 603 |
| CAL | GLP | 1000 | heroin | air | 604 |
| CAL | GLP | 1000 | heroin | air | 501 |
| CAL | GLP | 1000 | heroin | air | 502 |
| CAL | GLP | 1000 | heroin | air | 503 |
| CAL | GLP | 1000 | heroin | sea | 610 |
| CAL | GLP | 1000 | heroin | sea | 556 |
| CAL | GLP | 1000 | marijuana | sea | 601 |
| CAL | GLP | 1000 | marijuana | sea | 602 |
| CAL | GLP | 1000 | marijuana | sea | 200 |
| CAL | GLP | 1000 | marijuana | sea | 300 |
| CAL | GLP | 1000 | marijuana | sea | 400 |
| CAL | GLP | 1000 | morphine | air | 605 |
| CAL | GLP | 1000 | morphine | air | 606 |
| CAL | GLP | 1000 | morphine | air | 607 |
| CAL | GLP | 1000 | morphine | air | 504 |
| CAL | GLP | 1000 | morphine | air | 505 |
| CAL | GLP | 1000 | morphine | air | 506 |
| CAL | GLP | 1000 | morphine | air | 507 |
| CAL | GLP | 1000 | morphine | sea | 611 |
| CAL | GLP | 1000 | morphine | sea | 557 |
| CAL | GLP | 1000 | narcotics | air | 508 |
| CAL | GLP | 1000 | narcotics | sea | 612 |
| CAL | GLP | 1000 | narcotics | sea | 558 |
| CAL | GLP | 1000 | narcotics | sea | 559 |
| CAL | GLP | 1000 | stimulants | air | 300 |
| CAL | GLP | 1000 | stimulants | air | 310 |
| CAL | GLP | 1000 | stimulants | air | 320 |
| CAL | GLP | 1000 | stimulants | air | 330 |
| CAL | GLP | 1000 | stimulants | air | 340 |
| CAL | GLP | 2000 | stimulants | sea | 1900 |
| CAL | GLP | 2000 | stimulants | sea | 2000 |
| CAL | GLP | 2000 | stimulants | sea | 2100 |

| | | | | | |
|---|---|---|---|---|---|
| CAL | GLP | 2000 | stimulants | sea | 2200 |
| CAL | GLP | 2000 | stimulants | sea | 2300 |
| CAL | GLP | 3000 | stimulants | sea | 2400 |
| CJZ | CDR | 100 | hemp | air | 1212 |
| CJZ | CDR | 100 | morphine | air | 1045 |
| CJZ | CDR | 150 | hallucinogens | air | 2222 |
| CJZ | CDR | 200 | hallucinogens | ground | 2355 |
| CJZ | CDR | 200 | narcotics | ground | 2059 |
| CJZ | CDR | 950 | depressants | ground | 1600 |
| CJZ | CDR | 1000 | depressants | air | 900 |
| CJZ | CDR | 1000 | depressants | air | 2000 |
| CJZ | CDR | 1000 | depressants | air | 2300 |
| CJZ | CDR | 1500 | depressants | ground | 1200 |
| CJZ | CDR | 1500 | depressants | ground | 1300 |
| CJZ | CDR | 1500 | depressants | ground | 1400 |
| CJZ | CDR | 1550 | depressants | ground | 1500 |
| CJZ | CDR | 2000 | depressants | air | 1000 |
| CJZ | CDR | 2000 | depressants | air | 1111 |
| CJZ | CDR | 2000 | depressants | air | 1700 |
| CJZ | CDR | 2000 | depressants | air | 2100 |
| CJZ | CDR | 3000 | depressants | air | 2200 |
| CJZ | CDR | 3500 | depressants | ground | 2330 |
| CJZ | CDR | 3500 | depressants | ground | 2345 |
| CMN | CAL | 300 | hemp | ground | 1300 |
| CMN | CAL | 500 | hemp | air | 1300 |
| CMN | CAL | 500 | hemp | air | 2000 |
| CMN | CAL | 500 | heroin | air | 1500 |
| CMN | CAL | 500 | marijuana | air | 1200 |
| CMN | CAL | 500 | morphine | air | 1600 |
| CMN | CAL | 500 | morphine | ground | 900 |
| CMN | CAL | 500 | narcotics | ground | 400 |
| CMN | CAL | 1000 | cocaine | air | 700 |
| CMN | CAL | 1000 | cocaine | air | 710 |
| CMN | CAL | 1000 | cocaine | air | 720 |
| CMN | CAL | 1000 | cocaine | air | 730 |
| CMN | CAL | 1000 | cocaine | air | 735 |
| CMN | CAL | 1000 | cocaine | air | 740 |
| CMN | CAL | 1000 | cocaine | air | 745 |
| CMN | CAL | 1000 | cocaine | air | 900 |
| CMN | CAL | 1000 | cocaine | air | 1000 |
| CMN | CAL | 1000 | cocaine | air | 1100 |
| CMN | CAL | 1000 | hemp | ground | 2400 |
| CMN | CAL | 1000 | heroin | air | 400 |
| CMN | CAL | 1000 | heroin | air | 410 |
| CMN | CAL | 1000 | heroin | air | 415 |
| CMN | CAL | 1000 | heroin | air | 420 |
| CMN | CAL | 1000 | heroin | air | 425 |
| CMN | CAL | 1000 | heroin | air | 430 |
| CMN | CAL | 1000 | heroin | air | 435 |
| CMN | CAL | 1000 | heroin | air | 440 |
| CMN | CAL | 1000 | heroin | air | 445 |
| CMN | CAL | 1000 | heroin | air | 450 |
| CMN | CAL | 1000 | heroin | air | 455 |
| CMN | CAL | 1000 | heroin | ground | 800 |
| CMN | CAL | 1000 | heroin | ground | 200 |
| CMN | CAL | 1000 | marijuana | air | 1900 |

| | | | | | |
|---|---|---|---|---|---|
| CMN | CAL | 1000 | marijuana | ground | 1200 |
| CMN | CAL | 1000 | marijuana | ground | 2300 |
| CMN | CAL | 1000 | morphine | ground | 300 |
| CMN | CAL | 2000 | cocaine | air | 400 |
| CMN | CAL | 2000 | cocaine | air | 401 |
| CMN | CAL | 2000 | cocaine | air | 402 |
| CMN | CAL | 2000 | cocaine | air | 403 |
| CMN | CAL | 6000 | narcotics | air | 457 |
| CMN | MCB | 50 | narcotics | air | 1200 |
| CMN | MCB | 500 | cocaine | air | 1000 |
| CMN | MCB | 500 | cocaine | air | 1100 |
| CMN | MCB | 800 | hemp | air | 402 |
| CMN | MCB | 1000 | cocaine | air | 400 |
| CMN | MCB | 1000 | cocaine | air | 401 |
| CMN | MCB | 1000 | cocaine | air | 402 |
| CMN | MCB | 1000 | cocaine | air | 403 |
| CMN | MCB | 1000 | cocaine | air | 404 |
| CMN | MCB | 1000 | hemp | air | 800 |
| CMN | MCB | 1000 | heroin | air | 700 |
| CMN | MCB | 1000 | heroin | air | 400 |
| CMN | MCB | 1000 | heroin | ground | 1200 |
| CMN | MCB | 1000 | heroin | ground | 2400 |
| CMN | MCB | 1000 | marijuana | air | 700 |
| CMN | MCB | 1000 | marijuana | air | 400 |
| CMN | MCB | 1000 | morphine | air | 730 |
| CMN | MCB | 1000 | morphine | air | 500 |
| CMN | MCB | 1000 | morphine | ground | 1300 |
| CMN | MCB | 1000 | morphine | ground | 100 |
| CMN | MCB | 1000 | narcotics | ground | 1400 |
| CMN | MCB | 1100 | narcotics | ground | 200 |
| GLP | MZL | 800 | marijuana | sea | 700 |
| GLP | MZL | 1000 | cocaine | air | 600 |
| GLP | MZL | 1000 | cocaine | air | 900 |
| GLP | MZL | 1000 | heroin | sea | 615 |
| GLP | MZL | 1000 | heroin | sea | 700 |
| GLP | MZL | 1000 | heroin | sea | 745 |
| GLP | MZL | 1000 | heroin | sea | 900 |
| GLP | MZL | 1000 | heroin | sea | 1045 |
| GLP | MZL | 1000 | heroin | sea | 1100 |
| GLP | MZL | 1000 | heroin | sea | 1400 |
| GLP | MZL | 1000 | stimulants | air | 1750 |
| GLP | MZL | 1000 | stimulants | air | 1755 |
| GLP | MZL | 1000 | stimulants | sea | 610 |
| GLP | MZL | 2000 | marijuana | sea | 1530 |
| GLP | MZL | 2000 | stimulants | sea | 645 |
| GLP | MZL | 3000 | marijuana | sea | 615 |
| GLP | MZL | 3000 | stimulants | sea | 655 |
| GLP | MZL | 4000 | stimulants | sea | 608 |
| GLP | MZL | 4000 | stimulants | sea | 700 |
| GLP | MZL | 5000 | heroin | air | 800 |
| GLP | MZL | 5000 | heroin | air | 1005 |
| GLP | MZL | 5000 | heroin | air | 1245 |
| JCM | NGR | 100 | narcotics | air | 1300 |
| JCM | NGR | 200 | hallucinogens | air | 1200 |
| JCM | NGR | 250 | marijuana | sea | 1100 |
| JCM | NGR | 300 | cocaine | air | 900 |

| | | | | | |
|---|---|---|---|---|---|
| JCM | NGR | 300 | depressants | air | 900 |
| JCM | NGR | 300 | depressants | sea | 1100 |
| JCM | NGR | 350 | hallucinogens | sea | 2000 |
| JCM | NGR | 350 | morphine | sea | 1000 |
| JCM | NGR | 400 | hallucinogens | sea | 1300 |
| JCM | NGR | 450 | cocaine | sea | 900 |
| JCM | NGR | 500 | depressants | air | 2400 |
| JCM | NGR | 500 | depressants | sea | 2400 |
| JCM | NGR | 500 | marijuana | air | 1200 |
| JCM | NGR | 750 | marijuana | sea | 400 |
| JCM | NGR | 790 | morphine | sea | 100 |
| JCM | NGR | 900 | morphine | air | 2400 |
| JCM | NGR | 1000 | cocaine | air | 400 |
| JCM | NGR | 1000 | cocaine | sea | 800 |
| JCM | NGR | 1000 | depressants | air | 2300 |
| JCM | NGR | 1000 | depressants | sea | 1000 |
| JCM | NGR | 1000 | depressants | sea | 2300 |
| JCM | NGR | 1000 | hallucinogens | air | 400 |
| JCM | NGR | 1000 | hallucinogens | sea | 1200 |
| JCM | NGR | 1000 | hallucinogens | sea | 1900 |
| JCM | NGR | 1000 | heroin | air | 1100 |
| JCM | NGR | 1000 | heroin | air | 2300 |
| JCM | NGR | 1000 | heroin | sea | 800 |
| JCM | NGR | 1000 | heroin | sea | 2400 |
| JCM | NGR | 1000 | marijuana | air | 2300 |
| JCM | NGR | 1000 | marijuana | sea | 1000 |
| JCM | NGR | 1000 | marijuana | sea | 300 |
| JCM | NGR | 1000 | morphine | air | 1200 |
| JCM | NGR | 1100 | cocaine | air | 500 |
| JCM | NGR | 1100 | cocaine | sea | 400 |
| JCM | NGR | 1150 | hallucinogens | air | 300 |
| JCM | NGR | 1500 | marijuana | air | 2200 |
| JCM | NGR | 2000 | cocaine | air | 300 |
| JCM | NGR | 2000 | cocaine | sea | 200 |
| JCM | NGR | 2000 | cocaine | sea | 300 |
| LPZ | STR | 500 | narcotics | ground | 1500 |
| LPZ | STR | 500 | stimulants | sea | 500 |
| LPZ | STR | 1000 | morphine | sea | 30 |
| LPZ | STR | 1500 | cannabis | air | 1256 |
| LPZ | STR | 1500 | marijuana | sea | 30 |
| LPZ | STR | 1500 | stimulants | sea | 30 |
| LPZ | STR | 1500 | stimulants | sea | 130 |
| LPZ | STR | 2000 | narcotics | sea | 30 |
| LPZ | STR | 2500 | heroin | air | 1430 |
| LPZ | STR | 2500 | morphine | air | 130 |
| MCB | JCM | 900 | marijuana | air | 900 |
| MCB | JCM | 900 | marijuana | air | 400 |
| MCB | JCM | 1000 | cocaine | air | 1100 |
| MCB | JCM | 1000 | heroin | sea | 700 |
| MCB | JCM | 1000 | heroin | sea | 300 |
| MCB | JCM | 1000 | morphine | sea | 900 |
| MCB | JCM | 1000 | morphine | sea | 400 |
| MCB | JCM | 1000 | narcotics | sea | 500 |
| MCB | JCM | 1000 | stimulants | air | 1300 |
| MCB | JCM | 1500 | narcotics | sea | 1000 |
| MCB | JCM | 1650 | narcotics | sea | 200 |

| | | | | | |
|---|---|---|---|---|---|
| MCB | JCM | 2000 | cocaine | air | 1000 |
| MCB | JCM | 2000 | hemp | air | 300 |
| MCB | JCM | 2000 | heroin | sea | 550 |
| MCB | JCM | 3000 | cocaine | air | 900 |
| MCB | JCM | 5000 | cocaine | air | 400 |
| MCB | JCM | 6000 | cocaine | air | 800 |
| MCB | JCM | 8000 | cocaine | air | 300 |
| MZL | NRJ | 100 | heroin | air | 100 |
| MZL | NRJ | 100 | heroin | ground | 800 |
| MZL | NRJ | 100 | marijuana | air | 909 |
| MZL | NRJ | 100 | morphine | ground | 700 |
| MZL | NRJ | 200 | heroin | ground | 2300 |
| MZL | NRJ | 200 | morphine | ground | 2300 |
| MZL | NRJ | 200 | narcotics | air | 1000 |
| MZL | NRJ | 200 | narcotics | ground | 800 |
| MZL | NRJ | 200 | narcotics | ground | 2300 |
| MZL | NRJ | 300 | cocaine | air | 102 |
| MZL | NRJ | 300 | cocaine | air | 304 |
| MZL | NRJ | 300 | cocaine | ground | 557 |
| MZL | NRJ | 300 | hashish | air | 700 |
| MZL | NRJ | 300 | hemp | air | 700 |
| MZL | NRJ | 300 | marijuana | air | 710 |
| MZL | NRJ | 300 | morphine | air | 2300 |
| MZL | NRJ | 300 | narcotics | air | 0 |
| MZL | NRJ | 300 | narcotics | air | 100 |
| MZL | NRJ | 300 | stimulants | air | 1 |
| MZL | NRJ | 300 | stimulants | air | 203 |
| MZL | NRJ | 300 | stimulants | air | 405 |
| MZL | NRJ | 500 | cocaine | air | 630 |
| MZL | NRJ | 500 | cocaine | air | 900 |
| MZL | NRJ | 500 | cocaine | ground | 606 |
| MZL | NRJ | 500 | stimulants | air | 630 |
| MZL | NRJ | 500 | stimulants | air | 900 |
| MZL | NRJ | 600 | heroin | air | 627 |
| MZL | NRJ | 800 | heroin | air | 900 |
| MZL | NRJ | 800 | morphine | air | 700 |
| MZL | NRJ | 800 | narcotics | air | 600 |
| MZL | NRJ | 800 | narcotics | air | 800 |
| MZL | TDS | 200 | marijuana | sea | 1200 |
| MZL | TDS | 200 | marijuana | sea | 1300 |
| MZL | TDS | 250 | stimulants | sea | 613 |
| MZL | TDS | 250 | stimulants | sea | 800 |
| MZL | TDS | 300 | heroin | sea | 100 |
| MZL | TDS | 300 | heroin | sea | 200 |
| MZL | TDS | 350 | stimulants | sea | 400 |
| MZL | TDS | 350 | stimulants | sea | 2330 |
| MZL | TDS | 400 | heroin | sea | 610 |
| MZL | TDS | 400 | heroin | sea | 800 |
| MZL | TDS | 400 | heroin | sea | 948 |
| MZL | TDS | 400 | heroin | sea | 1414 |
| MZL | TDS | 400 | marijuana | sea | 1100 |
| MZL | TDS | 400 | morphine | sea | 1111 |
| MZL | TDS | 400 | narcotics | sea | 500 |
| MZL | TDS | 800 | cannabis | sea | 700 |
| MZL | TDS | 800 | hashish | sea | 900 |
| MZL | TDS | 800 | hemp | sea | 800 |

| | | | | | |
|---|---|---|---|---|---|
| MZL | TDS | 800 | marijuana | sea | 900 |
| MZL | TDS | 800 | marijuana | sea | 1000 |
| MZL | TDS | 1000 | heroin | air | 610 |
| MZL | TDS | 1000 | morphine | air | 1200 |
| MZL | TDS | 1000 | narcotics | air | 800 |
| MZL | TDS | 1000 | narcotics | air | 530 |
| MZL | TDS | 1500 | cocaine | sea | 400 |
| MZL | TDS | 1500 | cocaine | sea | 2330 |
| MZL | TDS | 2000 | cocaine | sea | 613 |
| MZL | TDS | 2000 | cocaine | sea | 800 |
| MZL | TDS | 8000 | heroin | sea | 900 |
| NGR | PJZ | 100 | morphine | air | 1400 |
| NGR | PJZ | 500 | marijuana | air | 1200 |
| NGR | PJZ | 500 | marijuana | air | 1300 |
| NGR | PJZ | 600 | cocaine | sea | 555 |
| NGR | PJZ | 700 | marijuana | sea | 1200 |
| NGR | PJZ | 700 | marijuana | sea | 1300 |
| NGR | PJZ | 700 | marijuana | sea | 400 |
| NGR | PJZ | 1000 | cocaine | sea | 900 |
| NGR | PJZ | 1000 | heroin | air | 1200 |
| NGR | PJZ | 1000 | marijuana | sea | 300 |
| NGR | PJZ | 1360 | cocaine | sea | 945 |
| NGR | PJZ | 2000 | cocaine | sea | 345 |
| NGR | PJZ | 2000 | cocaine | sea | 550 |
| NGR | PJZ | 2000 | heroin | sea | 1100 |
| NGR | PJZ | 2000 | heroin | sea | 2100 |
| NGR | PJZ | 2130 | morphine | sea | 2200 |
| NGR | PJZ | 2500 | cocaine | sea | 450 |
| NGR | PJZ | 3000 | morphine | sea | 1130 |
| NRJ | LUX | 200 | cocaine | air | 500 |
| NRJ | LUX | 200 | narcotics | air | 2000 |
| NRJ | LUX | 300 | cannabis | air | 400 |
| NRJ | LUX | 300 | heroin | air | 2000 |
| NRJ | LUX | 300 | marijuana | sea | 200 |
| NRJ | LUX | 300 | morphine | air | 200 |
| NRJ | LUX | 300 | narcotics | air | 200 |
| NRJ | LUX | 400 | hashish | ground | 1200 |
| NRJ | LUX | 400 | morphine | ground | 100 |
| NRJ | LUX | 430 | stimulants | sea | 400 |
| NRJ | LUX | 430 | stimulants | sea | 500 |
| NRJ | LUX | 440 | cocaine | sea | 500 |
| NRJ | LUX | 500 | heroin | ground | 100 |
| NRJ | LUX | 500 | heroin | sea | 515 |
| NRJ | LUX | 500 | morphine | sea | 500 |
| NRJ | LUX | 700 | cocaine | air | 200 |
| NRJ | LUX | 700 | cocaine | air | 400 |
| NRJ | LUX | 700 | stimulants | air | 200 |
| NRJ | LUX | 700 | stimulants | air | 400 |
| NRJ | LUX | 1000 | heroin | sea | 645 |
| NRJ | LUX | 1000 | morphine | sea | 645 |
| NRJ | LUX | 1000 | narcotics | sea | 645 |
| PCR | MCB | 1000 | cocaine | air | 600 |
| PCR | MCB | 1000 | cocaine | air | 601 |
| PCR | MCB | 1000 | cocaine | air | 602 |
| PCR | MCB | 1000 | cocaine | air | 440 |
| PCR | MCB | 2000 | cocaine | air | 400 |

| | | | | | |
|---|---|---|---|---|---|
| PCR | MCB | 2000 | cocaine | air | 401 |
| PCR | MCB | 2000 | cocaine | air | 402 |
| PCR | MCB | 2000 | cocaine | air | 403 |
| PCR | MCB | 2000 | cocaine | air | 404 |
| PCR | MCB | 3000 | cocaine | air | 430 |
| PCR | MCB | 3000 | cocaine | air | 435 |
| PCR | URB | 500 | hallucinogens | air | 200 |
| PCR | URB | 1000 | cocaine | air | 1200 |
| PCR | URB | 1000 | cocaine | air | 1202 |
| PCR | URB | 1000 | cocaine | air | 1203 |
| PCR | URB | 1000 | cocaine | air | 1204 |
| PCR | URB | 1000 | cocaine | air | 1205 |
| PCR | URB | 1000 | hallucinogens | air | 2400 |
| PCR | URB | 1000 | heroin | air | 200 |
| PCR | URB | 1000 | marijuana | air | 1200 |
| PCR | URB | 1000 | marijuana | air | 400 |
| PCR | URB | 1000 | marijuana | air | 401 |
| PCR | URB | 1000 | marijuana | air | 402 |
| PCR | URB | 1000 | morphine | air | 300 |
| PCR | URB | 1000 | narcotics | air | 1200 |
| PCR | URB | 1300 | marijuana | air | 403 |
| PCR | URB | 2000 | narcotics | air | 302 |
| PCR | URB | 3000 | cocaine | air | 400 |
| PCR | URB | 3000 | cocaine | air | 401 |
| PCR | URB | 3000 | cocaine | air | 402 |
| PCR | URB | 3000 | cocaine | air | 403 |
| PCR | URB | 3000 | cocaine | air | 404 |
| PCR | URB | 3000 | cocaine | air | 405 |
| PCR | URB | 3000 | cocaine | air | 406 |
| PJZ | BSL | 100 | heroin | sea | 1200 |
| PJZ | BSL | 100 | marijuana | air | 1200 |
| PJZ | BSL | 100 | morphine | sea | 1300 |
| PJZ | LUX | 150 | cocaine | air | 1200 |
| PJZ | LUX | 200 | cocaine | sea | 1000 |
| PJZ | LUX | 200 | heroin | air | 430 |
| PJZ | LUX | 300 | heroin | air | 800 |
| PJZ | LUX | 300 | morphine | air | 900 |
| PJZ | LUX | 300 | morphine | sea | 400 |
| PJZ | LUX | 400 | marijuana | air | 1300 |
| PJZ | LUX | 400 | narcotics | air | 700 |
| PJZ | LUX | 400 | narcotics | air | 500 |
| PJZ | LUX | 500 | depressants | sea | 1300 |
| PJZ | LUX | 500 | hallucinogens | air | 2400 |
| PJZ | LUX | 500 | marijuana | air | 200 |
| PJZ | LUX | 500 | marijuana | air | 300 |
| PJZ | LUX | 500 | marijuana | air | 400 |
| PJZ | LUX | 600 | heroin | air | 300 |
| PJZ | LUX | 800 | morphine | air | 400 |
| PJZ | LUX | 1000 | cocaine | air | 200 |
| PJZ | LUX | 1000 | cocaine | air | 300 |
| PJZ | LUX | 1000 | cocaine | air | 400 |
| PJZ | LUX | 1000 | cocaine | sea | 100 |
| PJZ | LUX | 1000 | cocaine | sea | 2400 |
| PJZ | LUX | 1000 | depressants | sea | 1200 |
| PJZ | LUX | 1000 | depressants | sea | 2000 |
| PJZ | LUX | 1000 | depressants | sea | 2200 |

| | | | | | |
|---|---|---|---|---|---|
| PJZ | LUX | 1000 | depressants | sea | 2300 |
| PJZ | LUX | 1000 | hallucinogens | air | 2300 |
| PJZ | LUX | 1000 | hallucinogens | sea | 100 |
| PJZ | LUX | 1000 | hallucinogens | sea | 2300 |
| PJZ | LUX | 1000 | hallucinogens | sea | 2400 |
| PJZ | LUX | 1000 | hashish | sea | 1530 |
| PJZ | LUX | 1000 | heroin | sea | 300 |
| PJZ | LUX | 1000 | marijuana | sea | 1400 |
| PJZ | LUX | 1000 | marijuana | sea | 1500 |
| PJZ | LUX | 1000 | marijuana | sea | 1600 |
| PJZ | LUX | 1000 | marijuana | sea | 2200 |
| PJZ | LUX | 1500 | cocaine | sea | 200 |
| PJZ | LUX | 2000 | marijuana | sea | 1900 |
| PJZ | LUX | 2000 | marijuana | sea | 2000 |
| PJZ | LUX | 2000 | marijuana | sea | 2100 |
| PJZ | LUX | 2000 | narcotics | air | 300 |
| PJZ | HWD | 50 | stimulants | sea | 900 |
| PJZ | MIA | 100 | cocaine | air | 400 |
| PJZ | MIA | 100 | cocaine | air | 500 |
| PJZ | MIA | 100 | marijuana | air | 1500 |
| PJZ | MIA | 100 | marijuana | air | 1600 |
| PJZ | MIA | 100 | marijuana | sea | 700 |
| PJZ | MIA | 100 | stimulants | sea | 800 |
| PJZ | MIA | 150 | hallucinogens | air | 330 |
| PJZ | MIA | 200 | hallucinogens | sea | 330 |
| PJZ | MIA | 200 | heroin | air | 630 |
| PJZ | MIA | 200 | marijuana | air | 400 |
| PJZ | MIA | 200 | marijuana | air | 410 |
| PJZ | MIA | 200 | marijuana | air | 420 |
| PJZ | MIA | 200 | marijuana | air | 430 |
| PJZ | MIA | 200 | marijuana | air | 440 |
| PJZ | MIA | 200 | marijuana | air | 450 |
| PJZ | MIA | 200 | marijuana | air | 500 |
| PJZ | MIA | 200 | marijuana | sea | 620 |
| PJZ | MIA | 200 | marijuana | sea | 1800 |
| PJZ | MIA | 200 | marijuana | sea | 1830 |
| PJZ | MIA | 200 | narcotics | air | 700 |
| PJZ | MIA | 230 | hallucinogens | sea | 400 |
| PJZ | MIA | 300 | depressants | sea | 400 |
| PJZ | MIA | 300 | hallucinogens | air | 300 |
| PJZ | MIA | 300 | hallucinogens | air | 400 |
| PJZ | MIA | 300 | marijuana | air | 510 |
| PJZ | MIA | 300 | narcotics | sea | 230 |
| PJZ | MIA | 500 | cocaine | sea | 300 |
| PJZ | MIA | 500 | cocaine | sea | 345 |
| PJZ | MIA | 500 | cocaine | sea | 440 |
| PJZ | MIA | 500 | cocaine | sea | 450 |
| PJZ | MIA | 500 | narcotics | sea | 200 |
| PJZ | MIA | 500 | narcotics | sea | 300 |
| PJZ | MIA | 600 | cocaine | sea | 515 |
| PJZ | MIA | 600 | morphine | air | 650 |
| PJZ | CGB | 1000 | cocaine | sea | 500 |
| PJZ | CGB | 1500 | cocaine | sea | 515 |
| STR | CJZ | 300 | depressants | air | 1000 |
| STR | CJZ | 400 | hallucinogens | ground | 957 |
| STR | CJZ | 500 | hallucinogens | air | 1048 |

| | | | | | |
|---|---|---|---|---|---|
| STR | CJZ | 500 | hallucinogens | air | 123 |
| STR | CJZ | 500 | hallucinogens | air | 2200 |
| STR | CJZ | 500 | hemp | ground | 1400 |
| STR | CJZ | 500 | morphine | ground | 1212 |
| STR | CJZ | 600 | morphine | ground | 230 |
| STR | CJZ | 600 | narcotics | ground | 230 |
| STR | CJZ | 700 | depressants | air | 2222 |
| STR | CJZ | 1000 | cannabis | air | 909 |
| STR | CJZ | 1000 | cannabis | ground | 2200 |
| STR | CJZ | 1000 | depressants | air | 2000 |
| STR | CJZ | 1000 | hallucinogens | ground | 1 |
| STR | CJZ | 1000 | hemp | ground | 2340 |
| STR | CJZ | 1000 | heroin | air | 101 |
| STR | CJZ | 1000 | morphine | air | 230 |
| STR | CJZ | 1000 | narcotics | air | 950 |
| STR | CJZ | 1300 | depressants | ground | 936 |
| STR | CJZ | 1500 | depressants | ground | 2323 |
| STR | CJZ | 1700 | depressants | ground | 700 |
| STR | CJZ | 2000 | hashish | air | 2200 |
| STR | CJZ | 2500 | depressants | ground | 2121 |
| STR | CJZ | 3000 | hallucinogens | ground | 123 |
| STR | CJZ | 3000 | hallucinogens | ground | 234 |
| STR | CJZ | 3000 | hallucinogens | ground | 2345 |
| STR | CJZ | 3000 | marijuana | air | 2200 |
| STR | CJZ | 3000 | stimulants | ground | 530 |
| STR | CJZ | 3500 | stimulants | ground | 330 |
| STR | CJZ | 3500 | stimulants | ground | 2359 |
| TDS | LPZ | 400 | narcotics | air | 1200 |
| TDS | LPZ | 400 | stimulants | ground | 2345 |
| TDS | LPZ | 500 | cocaine | air | 800 |
| TDS | LPZ | 500 | narcotics | air | 202 |
| TDS | LPZ | 600 | cocaine | ground | 2345 |
| TDS | LPZ | 600 | morphine | air | 1200 |
| TDS | LPZ | 1000 | cocaine | ground | 1010 |
| TDS | LPZ | 1000 | morphine | ground | 2200 |
| TDS | LPZ | 1000 | narcotics | ground | 1100 |
| TDS | LPZ | 1000 | narcotics | ground | 2200 |
| TDS | LPZ | 1000 | stimulants | ground | 800 |
| TDS | LPZ | 1500 | hashish | air | 1414 |
| TDS | LPZ | 1500 | hemp | air | 1400 |
| TDS | LPZ | 2000 | heroin | ground | 1200 |
| TDS | LPZ | 2000 | morphine | ground | 1300 |
| TDS | TJA | 100 | stimulants | sea | 200 |
| TDS | TJA | 300 | cocaine | sea | 100 |
| TDS | TJA | 300 | cocaine | sea | 200 |
| TDS | TJA | 300 | stimulants | sea | 100 |
| TDS | TJA | 500 | heroin | sea | 1400 |
| TDS | TJA | 500 | morphine | sea | 1330 |
| TDS | TJA | 500 | morphine | sea | 1400 |
| TDS | TJA | 600 | cannabis | sea | 244 |
| TDS | TJA | 600 | hemp | sea | 244 |
| TDS | TJA | 600 | heroin | sea | 500 |
| TDS | TJA | 600 | marijuana | sea | 244 |
| TDS | TJA | 700 | narcotics | ground | 1228 |
| TDS | TJA | 800 | morphine | sea | 500 |
| TDS | TJA | 800 | narcotics | sea | 400 |

| | | | | | |
|---|---|---|---|---|---|
| TDS | TJA | 800 | narcotics | sea | 500 |
| TJA | BOI | 100 | narcotics | air | 1212 |
| TJA | BOI | 200 | marijuana | ground | 1300 |
| TJA | BOI | 470 | stimulants | ground | 300 |
| TJA | BOI | 500 | cannabis | air | 1 |
| TJA | BOI | 500 | marijuana | ground | 200 |
| TJA | BOI | 500 | stimulants | air | 2200 |
| TJA | BOI | 600 | cannabis | ground | 2350 |
| TJA | BOI | 1000 | depressants | ground | 330 |
| TJA | BOI | 1500 | hallucinogens | air | 500 |
| TJA | BOI | 1515 | stimulants | ground | 0 |
| TJA | BOI | 1515 | stimulants | ground | 245 |
| TJA | BOI | 2000 | depressants | air | 230 |
| TJA | BOI | 2000 | depressants | ground | 101 |
| TJA | BOI | 2000 | morphine | air | 300 |
| TJA | BOI | 2000 | narcotics | ground | 548 |
| TJA | BOI | 3000 | heroin | air | 430 |
| TJA | BOI | 5000 | hallucinogens | ground | 200 |
| TJA | BOI | 5000 | hallucinogens | ground | 300 |
| TJA | BOI | 5000 | hallucinogens | ground | 400 |
| TJA | BOI | 5000 | hallucinogens | ground | 500 |
| URB | CAI | 500 | hallucinogens | sea | 530 |
| URB | CAI | 500 | hemp | air | 830 |
| URB | CAI | 500 | heroin | air | 800 |
| URB | CAI | 500 | marijuana | air | 800 |
| URB | CAI | 500 | morphine | air | 900 |
| URB | CAI | 500 | narcotics | air | 300 |
| URB | CAI | 500 | narcotics | sea | 900 |
| URB | CAI | 1000 | cocaine | air | 700 |
| URB | CAI | 1000 | cocaine | air | 710 |
| URB | CAI | 1000 | cocaine | air | 715 |
| URB | CAI | 1000 | cocaine | air | 720 |
| URB | CAI | 1000 | cocaine | air | 725 |
| URB | CAI | 1000 | cocaine | air | 500 |
| URB | CAI | 1000 | cocaine | air | 510 |
| URB | CAI | 1000 | cocaine | air | 515 |
| URB | CAI | 1000 | cocaine | air | 520 |
| URB | CAI | 1000 | cocaine | sea | 1203 |
| URB | CAI | 1000 | cocaine | sea | 203 |
| URB | CAI | 1000 | hallucinogens | sea | 500 |
| URB | CAI | 1000 | hemp | air | 430 |
| URB | CAI | 1000 | hemp | sea | 430 |
| URB | CAI | 1000 | heroin | sea | 100 |
| URB | CAI | 1000 | marijuana | air | 400 |
| URB | CAI | 1000 | morphine | sea | 200 |
| URB | CAI | 1000 | narcotics | sea | 300 |
| URB | CAI | 1300 | marijuana | sea | 400 |
| URB | CAI | 2000 | cocaine | sea | 1200 |
| URB | CAI | 2000 | cocaine | sea | 1201 |
| URB | CAI | 2000 | cocaine | sea | 1202 |
| URB | CAI | 3000 | cocaine | sea | 200 |
| URB | CAI | 3000 | cocaine | sea | 201 |
| URB | CAI | 3000 | cocaine | sea | 202 |

/* The IDEA database provides the analyst summary tables to help during the data fusion process.

```
The IDEA system prompted the analyst for some of
the information in these tables during the data
entry process.                  */

 print cities      /*List all cities in database.    */
 print substances  /*List all substances in database.*/
 print modes       /*List all modes in database.     */
```

cities relation

| name | id | lat | long |
|---|---|---|---|
| Bahama | BAH | 25.803 | -73.792 |
| Bay_Saint_Louis | BSL | 30.210 | -89.310 |
| Boise | BOI | 43.690 | -117.024 |
| Caicos | CAI | 22.476 | -73.880 |
| Cali | CAL | 0.816 | -79.005 |
| Cedar_Rapids | CDR | 40.750 | -90.250 |
| Ciudad_Juarez | CJZ | 33.262 | -107.138 |
| Contamana | CMN | -8.354 | -73.701 |
| Coral_Gables | CGB | 25.400 | -80.160 |
| Galapagos | GLP | -0.442 | -91.319 |
| Hollywood | HWD | 25.490 | -80.120 |
| Jacmel | JCM | 18.431 | -74.420 |
| La_Paz | LPZ | 26.252 | -111.272 |
| Manzanillo | MZL | 18.343 | -102.914 |
| Maracaibo | MCB | 10.972 | -73.522 |
| Miami | MIA | 25.750 | -80.250 |
| Naranjos | NRJ | 21.487 | -96.981 |
| New_Orleans | LUX | 29.000 | -90.000 |
| Nueva_Gerona | NGR | 21.500 | -82.959 |
| Puerto_Carreno | PCR | 5.128 | -65.882 |
| Puerto_Juarez | PJZ | 20.308 | -87.364 |
| Sta_Rosalia | STR | 31.555 | -114.868 |
| Tijuanna | TJA | 33.262 | -116.936 |
| Todos_Santos | TDS | 24.723 | -112.172 |
| Uribia | URB | 12.051 | -71.454 |

substances relation

| substance |
|---|
| cannabis |
| cocaine |
| depressants |
| hallucinogens |
| hashish |
| hemp |
| heroin |
| marijuana |
| morphine |
| narcotics |
| stimulants |

```
modes relation

|mode  |
|------|
|air   |
|ground|
|sea   |
|------|
```

```
/* Session for IDEA data Fusion  */

/* The analyst has decided to hold fixed a required
subset of cities in the database to be the nodes
portrayed graphically.  This is one option for
fusing the data into a manageable level.  Other
schemes of node reductions are possible (cluster
analysis, minimum absolute difference, etc.), but
this is the simplest and serves well to demonstrate
the fusion technique. */


/* This new list is created by the analyst, via menus
supplied by the IDEA system.  The "." indicator as
a node ID name (nodeid) represents a location that
is not a required node in the final arc/nodes
representation.  Each such node must be aggregated
with its nearest neighbor.                    */

print geography

geography relation
```

| name | id | easting | northing | nodeid |
|---|---|---|---|---|
| Bahama | BAH | -73.792 | 25.803 | BAH |
| Bay_Saint_Louis | BSL | -89.310 | 30.210 | . |
| Boise | BOI | -117.024 | 43.690 | BOI |
| Caicos | CAI | -73.880 | 22.476 | CAI |
| Cali | CAL | -79.005 | 0.816 | CAL |
| Cedar_Rapids | CDR | -90.250 | 40.750 | CDR |
| Ciudad_Juarez | CJZ | -107.138 | 33.262 | CJZ |
| Contamana | CMN | -73.701 | -8.354 | CMN |
| Coral_Gables | CGB | -80.160 | 25.400 | . |
| Galapagos | GLP | -91.319 | -0.442 | GLP |
| Hollywood | HWD | -80.120 | 25.490 | . |
| Jacmel | JCM | -74.420 | 18.431 | JCM |
| La_Paz | LPZ | -111.272 | 26.252 | LPZ |
| Manzanillo | MZL | -102.914 | 18.343 | MZL |
| Maracaibo | MCB | -73.522 | 10.972 | MCB |
| Miami | MIA | -80.250 | 25.750 | MIA |
| Naranjos | NRJ | -96.981 | 21.487 | NRJ |
| New Orleans | LUX | -90.000 | 29.000 | LUX |
| Nueva_Gerona | NGR | -82.959 | 21.500 | NGR |
| Puerto_Carreno | PCR | -65.882 | 5.128 | PCR |
| Puerto_Juarez | PJZ | -87.364 | 20.308 | PJZ |

| | | | | |
|---|---|---|---|---|
| Sta_Rosalia | STR | -114.868 | 31.555 | STR |
| Tijuanna | TJA | -116.936 | 33.262 | TJA |
| Uribia | URB | -71.454 | 12.051 | URB |
| Todos_Santos | TDS | -112.172 | 24.723 | TDS |

```
/*  First, calculate "Cartesian distance", using LAT/LONG
    as (x, y) coordinates, and place into a table labeled
    'grouping.'                                            */
set g geography      /*  Need to have two "counters"     */
set z geography      /*  search through the node list    */
 .                   /*  to calc all pairs of distances. */


ret into grouping ( g.id, groupwith = z.id,
     distance = sqrt( ( g.northing - z.northing ) ** 2 +
                      ( g.easting  - z.easting  ) ** 2 ) )
   where g.nodeid = "." and z.nodeid != "."


/*  This calculates distance between each unassigned node
    to a required node.  */


print grouping

grouping relation
```

| id | groupw | distance |
|---|---|---|
| BSL | BAH | 16.132 |
| BSL | BOI | 30.819 |
| BSL | CAI | 17.259 |
| BSL | CAL | 31.148 |
| BSL | CDR | 10.582 |
| BSL | CJZ | 18.087 |
| BSL | CMN | 41.603 |
| BSL | GLP | 30.718 |
| BSL | JCM | 18.986 |
| BSL | LPZ | 22.316 |
| BSL | LUX | 1.393 |
| BSL | MCB | 24.887 |
| BSL | MIA | 10.098 |
| BSL | MZL | 18.053 |
| BSL | NGR | 10.779 |
| BSL | NRJ | 11.616 |
| BSL | PCR | 34.322 |
| BSL | PJZ | 10.091 |
| BSL | STR | 25.593 |
| BSL | TDS | 23.511 |
| BSL | TJA | 27.794 |
| BSL | URB | 25.467 |
| CGB | BAH | 6.381 |
| CGB | BOI | 41.152 |
| CGB | CAI | 6.927 |

| | | |
|---|---|---|
| CGB | CAL | 24.611 |
| CGB | CDR | 18.369 |
| CGB | CJZ | 28.100 |
| CGB | CMN | 34.366 |
| CGB | GLP | 28.148 |
| CGB | JCM | 9.028 |
| CGB | LPZ | 31.124 |
| CGB | LUX | 10.478 |
| CGB | MCB | 15.882 |
| CGB | MIA | 0.361 |
| CGB | MZL | 23.823 |
| CGB | NGR | 4.801 |
| CGB | NRJ | 17.270 |
| CGB | PCR | 24.795 |
| CGB | PJZ | 8.822 |
| CGB | STR | 35.249 |
| CGB | TDS | 32.019 |
| CGB | TJA | 37.607 |
| CGB | URB | 15.937 |
| HWD | BAH | 6.336 |
| HWD | BOI | 41.148 |
| HWD | CAI | 6.929 |
| HWD | CAL | 24.699 |
| HWD | CDR | 18.316 |
| HWD | CJZ | 28.114 |
| HWD | CMN | 34.447 |
| HWD | GLP | 28.247 |
| HWD | JCM | 9.073 |
| HWD | LPZ | 31.162 |
| HWD | LUX | 10.485 |
| HWD | MCB | 15.947 |
| HWD | MIA | 0.291 |
| HWD | MZL | 23.888 |
| HWD | NGR | 4.897 |
| HWD | NRJ | 17.329 |
| HWD | PCR | 24.846 |
| HWD | PJZ | 8.907 |
| HWD | STR | 35.273 |
| HWD | TDS | 32.061 |
| HWD | TJA | 37.627 |
| HWD | URB | 15.990 |

```
/* Now, select the closest required node to each
unassigned node.  */

set g grouping

ret into cluster ( g.id, g.groupwith )
   where g.distance = min( g.distance by g.id )

print cluster

cluster relation
```

| id | groupw |
|---|---|
| BSL | LUX |
| CGB | MIA |
| HWD | MIA |

```
/*  Add to this table of cluster nodes the required nodes.
This table will be used to assign shipments to arcs.*/

set g geography

append to cluster ( id = g.id, groupwith = g.nodeid )
   where g.id = g.nodeid

modify cluster to ISAM /*  Sorts table alphabetically.  */
print cluster          /*  ISAM => Indexed Sequential   */
```

cluster relation

| id | groupw |
|---|---|
| BAH | BAH |
| BOI | BOI |
| BSL | LUX |
| CAI | CAI |
| CAL | CAL |
| CDR | CDR |
| CGB | MIA |
| CJZ | CJZ |
| CMN | CMN |
| GLP | GLP |
| HWD | MIA |
| JCM | JCM |
| LPZ | LPZ |
| LUX | LUX |
| MCB | MCB |
| MIA | MIA |
| MZL | MZL |
| NGR | NGR |
| NRJ | NRJ |
| PCR | PCR |
| PJZ | PJZ |
| STR | STR |
| TDS | TDS |
| TJA | TJA |
| URB | URB |

/* Once the analyst has finalized the node set, the analyst can determine the number of different arcs eminating from these nodes as shown by the database. Much of this is automated in the IDEA System fusion process. */

/* Calculate the unique origin-destination pairs.*/

```
set i initialdata

ret into pairs ( i.origin, i.destination )

print pairs

pairs relation
```

| origin | destin |
|---|---|
| BAH | HWD |
| BAH | MIA |
| CAI | MIA |
| CAL | GLP |
| CJZ | CDR |
| CMN | CAL |
| CMN | MCB |
| GLP | MZL |
| JCM | NGR |
| LPZ | STR |
| MCB | JCM |
| MZL | NRJ |
| MZL | TDS |
| NGR | PJZ |
| NRJ | LUX |
| PCR | MCB |
| PCR | URB |
| PJZ | BSL |
| PJZ | CGB |
| PJZ | HWD |
| PJZ | LUX |
| PJZ | MIA |
| STR | CJZ |
| TDS | LPZ |
| TDS | TJA |
| TJA | BOI |
| URB | CAI |

/* Now, apply the node cluster mapping pattern determined above, stored in the table "Cluster. */

```
set p pairs
set c cluster
set k cluster

ret into arcs ( origin = c.groupwith,
                destination = k.groupwith )
   where p.origin = c.id
                 and
    p.destination = k.id

/*  Note: This retrieve must only retain the UNIQUE
pairs of nodes.   */

print arcs

arcs relation
```

| origin | destin |
|---|---|
| BAH | MIA |
| CAI | MIA |
| CAL | GLP |
| CJZ | CDR |
| CMN | CAL |
| CMN | MCB |
| GLP | MZL |
| JCM | NGR |
| LPZ | STR |
| MCB | JCM |
| MZL | NRJ |
| MZL | TDS |
| NGR | PJZ |
| NRJ | LUX |
| PCR | MCB |
| PCR | URB |
| PJZ | LUX |
| PJZ | MIA |
| STR | CJZ |
| TDS | LPZ |
| TDS | TJA |
| TJA | BOI |
| URB | CAI |

```
/*  This table shows 23 different arcs are found
in the initial data, based on the required set
of nodes.                       */

/*  Next, the analyst assigns the different
```

```
substances found throughout the database and
assigns them to categories, the results of which
are presented in the drug "Class Table."    */


print class

class relation
```

| substance | category |
|---|---|
| cannabis | cannabis |
| hashish | cannabis |
| hemp | cannabis |
| marijuana | cannabis |
| depressants | depressants |
| hallucinogens | hallucinogens |
| heroin | narcotics |
| morphine | narcotics |
| narcotics | narcotics |
| cocaine | stimulants |
| stimulants | stimulants |

```
/* At this point, the IDEA system has enough
information provided by the analyst to fuse
the inital set of data into the chosen sets
of data by arc, mode, drug category, and,
additionally, time aggregated by day-or-night.*/

/* Expand the inital dataset to include the drug
category of the substance in the shipment report
and a flag to identify a day or night interdiction.
In this example, day is taken as times between
0600 - 1759, inclusively.*/


set i initialdata
set c class

ret into shipments ( i.origin, i.destination,
                     i.amount, c.category, i.mode,
                     day = "night",
                     i.substance, time = int4(i.time) )
   where i.substance = c.substance   and
         i.time < 0600  or  i.time >= 1800

append to shipments ( i.origin, i.destination,
                      i.amount, c.category, i.mode,
                      day = "day",
```

```
                    i.substance, time = int4(i.time) )
   where i.substance = c.substance   and
         i.time >= 0600 and i.time < 1800

print shipments

shipments relation
```

| org | dest | amt | category | mode | day | substance | time |
|---|---|---|---|---|---|---|---|
| BAH | MIA | 40 | hallucin | air | night | hallucin | 500 |
| BAH | MIA | 100 | cannabis | sea | day | cannabis | 1400 |
| BAH | MIA | 200 | cannabis | air | night | hashish | 300 |
| BAH | MIA | 200 | cannabis | air | night | marijuana | 0 |
| BAH | MIA | 200 | cannabis | air | night | marijuana | 100 |
| BAH | MIA | 200 | cannabis | air | night | marijuana | 2300 |
| BAH | MIA | 200 | narcotic | sea | day | heroin | 1300 |
| BAH | MIA | 300 | cannabis | air | day | cannabis | 1200 |
| BAH | MIA | 300 | cannabis | air | day | marijuana | 1500 |
| BAH | MIA | 300 | cannabis | air | night | cannabis | 200 |
| BAH | MIA | 300 | cannabis | air | night | hemp | 400 |
| BAH | MIA | 300 | cannabis | air | night | marijuana | 500 |
| BAH | MIA | 300 | cannabis | air | night | marijuana | 2200 |
| BAH | MIA | 300 | stimulan | air | night | cocaine | 500 |
| BAH | MIA | 370 | hallucin | air | night | hallucino | 200 |
| BAH | MIA | 370 | hallucin | air | night | hallucino | 300 |
| BAH | MIA | 370 | hallucin | air | night | hallucino | 400 |
| BAH | MIA | 400 | cannabis | air | day | hashish | 1700 |
| BAH | MIA | 400 | stimulan | sea | night | stimulana | 550 |
| BAH | MIA | 500 | cannabis | sea | night | cannabis | 303 |
| BAH | MIA | 500 | cannabis | sea | night | hemp | 404 |
| BAH | MIA | 500 | narcotic | air | day | heroin | 1111 |
| BAH | MIA | 500 | narcotic | air | day | morphine | 1111 |
| BAH | MIA | 500 | narcotic | air | night | heroin | 30 |
| BAH | MIA | 500 | narcotic | air | night | heroin | 300 |
| BAH | MIA | 500 | narcotic | air | night | morphine | 30 |
| BAH | MIA | 500 | narcotic | air | night | narcotics | 30 |
| BAH | MIA | 600 | stimulan | sea | night | cocaine | 300 |
| BAH | MIA | 600 | stimulan | sea | night | cocaine | 400 |
| BAH | MIA | 600 | stimulan | sea | night | cocaine | 500 |
| BAH | MIA | 600 | stimulan | sea | night | stimulana | 300 |
| BAH | MIA | 600 | stimulan | sea | night | stimulana | 400 |
| BAH | MIA | 600 | stimulan | sea | night | stimulana | 500 |
| BAH | MIA | 700 | cannabis | sea | day | marijuana | 1400 |
| BAH | MIA | 700 | cannabis | sea | day | marijuana | 1600 |
| BAH | MIA | 700 | cannabis | sea | night | cannabis | 0 |
| BAH | MIA | 700 | cannabis | sea | night | hashish | 202 |
| BAH | MIA | 700 | cannabis | sea | night | marijuana | 101 |
| BAH | MIA | 700 | hallucin | sea | night | hallucino | 300 |
| BAH | MIA | 700 | hallucin | sea | night | hallucino | 400 |
| BAH | MIA | 700 | hallucin | sea | night | hallucino | 500 |
| BAH | MIA | 700 | narcotic | sea | night | heroin | 400 |

| | | | | | | | |
|---|---|---|---|---|---|---|---|
| BAH | MIA | 700 | narcotic | sea | night | morphine | 415 |
| BAH | MIA | 700 | narcotic | sea | night | narcotics | 430 |
| CAI | MIA | 100 | cannabis | sea | day | marijuana | 715 |
| CAI | MIA | 100 | cannabis | sea | night | marijuana | 400 |
| CAI | MIA | 150 | cannabis | air | day | marijuana | 630 |
| CAI | MIA | 270 | hallucin | air | night | hallucino | 545 |
| CAI | MIA | 300 | hallucin | air | night | hallucino | 500 |
| CAI | MIA | 300 | hallucin | air | night | hallucino | 515 |
| CAI | MIA | 300 | hallucin | air | night | hallucino | 530 |
| CAI | MIA | 360 | hallucin | sea | night | hallucino | 555 |
| CAI | MIA | 400 | cannabis | sea | day | cannabis | 1200 |
| CAI | MIA | 400 | cannabis | sea | day | cannabis | 1500 |
| CAI | MIA | 400 | cannabis | sea | day | hashish | 1200 |
| CAI | MIA | 400 | cannabis | sea | day | hemp | 1200 |
| CAI | MIA | 400 | cannabis | sea | day | marijuana | 1200 |
| CAI | MIA | 400 | hallucin | sea | night | hallucino | 345 |
| CAI | MIA | 400 | hallucin | sea | night | hallucino | 445 |
| CAI | MIA | 400 | hallucin | sea | night | hallucino | 545 |
| CAI | MIA | 400 | narcotic | sea | night | heroin | 230 |
| CAI | MIA | 400 | narcotic | sea | night | morphine | 230 |
| CAI | MIA | 400 | narcotic | sea | night | morphine | 320 |
| CAI | MIA | 400 | narcotic | sea | night | narcotics | 230 |
| CAI | MIA | 500 | cannabis | air | night | hashish | 300 |
| CAI | MIA | 500 | cannabis | air | night | hemp | 300 |
| CAI | MIA | 500 | cannabis | air | night | marijuana | 300 |
| CAI | MIA | 500 | depressa | sea | night | depressan | 0 |
| CAI | MIA | 500 | depressa | sea | night | depressan | 100 |
| CAI | MIA | 500 | depressa | sea | night | depressan | 200 |
| CAI | MIA | 500 | depressa | sea | night | depressan | 300 |
| CAI | MIA | 500 | depressa | sea | night | depressan | 400 |
| CAI | MIA | 500 | depressa | sea | night | depressan | 2300 |
| CAI | MIA | 600 | cannabis | sea | night | cannabis | 200 |
| CAI | MIA | 600 | cannabis | sea | night | cannabis | 300 |
| CAI | MIA | 600 | cannabis | sea | night | cannabis | 400 |
| CAI | MIA | 600 | cannabis | sea | night | hashish | 300 |
| CAI | MIA | 600 | cannabis | sea | night | hemp | 200 |
| CAI | MIA | 600 | stimulan | sea | night | cocaine | 1 |
| CAI | MIA | 600 | stimulan | sea | night | cocaine | 401 |
| CAI | MIA | 600 | stimulan | sea | night | cocaine | 505 |
| CAI | MIA | 600 | stimulan | sea | night | stimulana | 359 |
| CAI | MIA | 600 | stimulan | sea | night | stimulana | 2359 |
| CAL | GLP | 800 | cannabis | sea | night | marijuana | 500 |
| CAL | GLP | 1000 | cannabis | sea | day | marijuana | 601 |
| CAL | GLP | 1000 | cannabis | sea | day | marijuana | 602 |
| CAL | GLP | 1000 | cannabis | sea | night | marijuana | 200 |
| CAL | GLP | 1000 | cannabis | sea | night | marijuana | 300 |
| CAL | GLP | 1000 | cannabis | sea | night | marijuana | 400 |
| CAL | GLP | 1000 | narcotic | air | day | heroin | 601 |
| CAL | GLP | 1000 | narcotic | air | day | heroin | 602 |
| CAL | GLP | 1000 | narcotic | air | day | heroin | 603 |
| CAL | GLP | 1000 | narcotic | air | day | heroin | 604 |
| CAL | GLP | 1000 | narcotic | air | day | morphine | 605 |

| | | | | | | | |
|---|---|---|---|---|---|---|---|
| CAL | GLP | 1000 | narcotic | air | day | morphine | 606 |
| CAL | GLP | 1000 | narcotic | air | day | morphine | 607 |
| CAL | GLP | 1000 | narcotic | air | night | heroin | 501 |
| CAL | GLP | 1000 | narcotic | air | night | heroin | 502 |
| CAL | GLP | 1000 | narcotic | air | night | heroin | 503 |
| CAL | GLP | 1000 | narcotic | air | night | morphine | 504 |
| CAL | GLP | 1000 | narcotic | air | night | morphine | 505 |
| CAL | GLP | 1000 | narcotic | air | night | morphine | 506 |
| CAL | GLP | 1000 | narcotic | air | night | morphine | 507 |
| CAL | GLP | 1000 | narcotic | air | night | narcotics | 508 |
| CAL | GLP | 1000 | narcotic | sea | day | heroin | 610 |
| CAL | GLP | 1000 | narcotic | sea | day | morphine | 611 |
| CAL | GLP | 1000 | narcotic | sea | day | narcotics | 612 |
| CAL | GLP | 1000 | narcotic | sea | night | heroin | 556 |
| CAL | GLP | 1000 | narcotic | sea | night | morphine | 557 |
| CAL | GLP | 1000 | narcotic | sea | night | narcotics | 558 |
| CAL | GLP | 1000 | narcotic | sea | night | narcotics | 559 |
| CAL | GLP | 1000 | stimulan | air | night | stimulana | 300 |
| CAL | GLP | 1000 | stimulan | air | night | stimulana | 310 |
| CAL | GLP | 1000 | stimulan | air | night | stimulana | 320 |
| CAL | GLP | 1000 | stimulan | air | night | stimulana | 330 |
| CAL | GLP | 1000 | stimulan | air | night | stimulana | 340 |
| CAL | GLP | 2000 | stimulan | sea | night | stimulana | 1900 |
| CAL | GLP | 2000 | stimulan | sea | night | stimulana | 2000 |
| CAL | GLP | 2000 | stimulan | sea | night | stimulana | 2100 |
| CAL | GLP | 2000 | stimulan | sea | night | stimulana | 2200 |
| CAL | GLP | 2000 | stimulan | sea | night | stimulana | 2300 |
| CAL | GLP | 3000 | stimulan | sea | night | stimulana | 2400 |
| CJZ | CDR | 100 | cannabis | air | day | hemp | 1212 |
| CJZ | CDR | 100 | narcotic | air | day | morphine | 1045 |
| CJZ | CDR | 150 | hallucin | air | night | hallucino | 2222 |
| CJZ | CDR | 200 | hallucin | groun | night | hallucino | 2355 |
| CJZ | CDR | 200 | narcotic | groun | night | narcotics | 2059 |
| CJZ | CDR | 950 | depressa | groun | day | depressan | 1600 |
| CJZ | CDR | 1000 | depressa | air | day | depressan | 900 |
| CJZ | CDR | 1000 | depressa | air | night | depressan | 2000 |
| CJZ | CDR | 1000 | depressa | air | night | depressan | 2300 |
| CJZ | CDR | 1500 | depressa | groun | day | depressan | 1200 |
| CJZ | CDR | 1500 | depressa | groun | day | depressan | 1300 |
| CJZ | CDR | 1500 | depressa | groun | day | depressan | 1400 |
| CJZ | CDR | 1550 | depressa | groun | day | depressan | 1500 |
| CJZ | CDR | 2000 | depressa | air | day | depressan | 1000 |
| CJZ | CDR | 2000 | depressa | air | day | depressan | 1111 |
| CJZ | CDR | 2000 | depressa | air | day | depressan | 1700 |
| CJZ | CDR | 2000 | depressa | air | night | depressan | 2100 |
| CJZ | CDR | 3000 | depressa | air | night | depressan | 2200 |
| CJZ | CDR | 3500 | depressa | groun | night | depressan | 2330 |
| CJZ | CDR | 3500 | depressa | groun | night | depressan | 2345 |
| CMN | CAL | 300 | cannabis | groun | day | hemp | 1300 |
| CMN | CAL | 500 | cannabis | air | day | hemp | 1300 |
| CMN | CAL | 500 | cannabis | air | day | marijuana | 1200 |
| CMN | CAL | 500 | cannabis | air | night | hemp | 2000 |

| | | | | | | | |
|---|---|---|---|---|---|---|---|
| CMN | CAL | 500 | narcotic | air | day | heroin | 1500 |
| CMN | CAL | 500 | narcotic | air | day | morphine | 1600 |
| CMN | CAL | 500 | narcotic | groun | day | morphine | 900 |
| CMN | CAL | 500 | narcotic | groun | night | narcotics | 400 |
| CMN | CAL | 1000 | cannabis | air | night | marijuana | 1900 |
| CMN | CAL | 1000 | cannabis | groun | day | marijuana | 1200 |
| CMN | CAL | 1000 | cannabis | groun | night | hemp | 2400 |
| CMN | CAL | 1000 | cannabis | groun | night | marijuana | 2300 |
| CMN | CAL | 1000 | narcotic | air | night | heroin | 400 |
| CMN | CAL | 1000 | narcotic | air | night | heroin | 410 |
| CMN | CAL | 1000 | narcotic | air | night | heroin | 415 |
| CMN | CAL | 1000 | narcotic | air | night | heroin | 420 |
| CMN | CAL | 1000 | narcotic | air | night | heroin | 425 |
| CMN | CAL | 1000 | narcotic | air | night | heroin | 430 |
| CMN | CAL | 1000 | narcotic | air | night | heroin | 435 |
| CMN | CAL | 1000 | narcotic | air | night | heroin | 440 |
| CMN | CAL | 1000 | narcotic | air | night | heroin | 445 |
| CMN | CAL | 1000 | narcotic | air | night | heroin | 450 |
| CMN | CAL | 1000 | narcotic | air | night | heroin | 455 |
| CMN | CAL | 1000 | narcotic | groun | day | heroin | 800 |
| CMN | CAL | 1000 | narcotic | groun | night | heroin | 200 |
| CMN | CAL | 1000 | narcotic | groun | night | morphine | 300 |
| CMN | CAL | 1000 | stimulan | air | day | cocaine | 700 |
| CMN | CAL | 1000 | stimulan | air | day | cocaine | 710 |
| CMN | CAL | 1000 | stimulan | air | day | cocaine | 720 |
| CMN | CAL | 1000 | stimulan | air | day | cocaine | 730 |
| CMN | CAL | 1000 | stimulan | air | day | cocaine | 735 |
| CMN | CAL | 1000 | stimulan | air | day | cocaine | 740 |
| CMN | CAL | 1000 | stimulan | air | day | cocaine | 745 |
| CMN | CAL | 1000 | stimulan | air | day | cocaine | 900 |
| CMN | CAL | 1000 | stimulan | air | day | cocaine | 1000 |
| CMN | CAL | 1000 | stimulan | air | day | cocaine | 1100 |
| CMN | CAL | 2000 | stimulan | air | night | cocaine | 400 |
| CMN | CAL | 2000 | stimulan | air | night | cocaine | 401 |
| CMN | CAL | 2000 | stimulan | air | night | cocaine | 402 |
| CMN | CAL | 2000 | stimulan | air | night | cocaine | 403 |
| CMN | CAL | 6000 | narcotic | air | night | narcotics | 457 |
| CMN | MCB | 50 | narcotic | air | day | narcotics | 1200 |
| CMN | MCB | 500 | stimulan | air | day | cocaine | 1000 |
| CMN | MCB | 500 | stimulan | air | day | cocaine | 1100 |
| CMN | MCB | 800 | cannabis | air | night | hemp | 402 |
| CMN | MCB | 1000 | cannabis | air | day | hemp | 800 |
| CMN | MCB | 1000 | cannabis | air | day | marijuana | 700 |
| CMN | MCB | 1000 | cannabis | air | night | marijuana | 400 |
| CMN | MCB | 1000 | narcotic | air | day | heroin | 700 |
| CMN | MCB | 1000 | narcotic | air | day | morphine | 730 |
| CMN | MCB | 1000 | narcotic | air | night | heroin | 400 |
| CMN | MCB | 1000 | narcotic | air | night | morphine | 500 |
| CMN | MCB | 1000 | narcotic | groun | day | heroin | 1200 |
| CMN | MCB | 1000 | narcotic | groun | day | morphine | 1300 |
| CMN | MCB | 1000 | narcotic | groun | day | narcotics | 1400 |
| CMN | MCB | 1000 | narcotic | groun | night | heroin | 2400 |

| | | | | | | | |
|---|---|---|---|---|---|---|---|
| CMN | MCB | 1000 | narcotic | groun | night | morphine | 100 |
| CMN | MCB | 1000 | stimulan | air | night | cocaine | 400 |
| CMN | MCB | 1000 | stimulan | air | night | cocaine | 401 |
| CMN | MCB | 1000 | stimulan | air | night | cocaine | 402 |
| CMN | MCB | 1000 | stimulan | air | night | cocaine | 403 |
| CMN | MCB | 1000 | stimulan | air | night | cocaine | 404 |
| CMN | MCB | 1100 | narcotic | groun | night | narcotics | 200 |
| GLP | MZL | 800 | cannabis | sea | day | marijuana | 700 |
| GLP | MZL | 1000 | narcotic | sea | day | heroin | 615 |
| GLP | MZL | 1000 | narcotic | sea | day | heroin | 700 |
| GLP | MZL | 1000 | narcotic | sea | day | heroin | 745 |
| GLP | MZL | 1000 | narcotic | sea | day | heroin | 900 |
| GLP | MZL | 1000 | narcotic | sea | day | heroin | 1045 |
| GLP | MZL | 1000 | narcotic | sea | day | heroin | 1100 |
| GLP | MZL | 1000 | narcotic | sea | day | heroin | 1400 |
| GLP | MZL | 1000 | stimulan | air | day | cocaine | 600 |
| GLP | MZL | 1000 | stimulan | air | day | cocaine | 900 |
| GLP | MZL | 1000 | stimulan | air | day | stimulana | 1750 |
| GLP | MZL | 1000 | stimulan | air | day | stimulana | 1755 |
| GLP | MZL | 1000 | stimulan | sea | day | stimulana | 610 |
| GLP | MZL | 2000 | cannabis | sea | day | marijuana | 1530 |
| GLP | MZL | 2000 | stimulan | sea | day | stimulana | 645 |
| GLP | MZL | 3000 | cannabis | sea | day | marijuana | 615 |
| GLP | MZL | 3000 | stimulan | sea | day | stimulana | 655 |
| GLP | MZL | 4000 | stimulan | sea | day | stimulana | 608 |
| GLP | MZL | 4000 | stimulan | sea | day | stimulana | 700 |
| GLP | MZL | 5000 | narcotic | air | day | heroin | 800 |
| GLP | MZL | 5000 | narcotic | air | day | heroin | 1005 |
| GLP | MZL | 5000 | narcotic | air | day | heroin | 1245 |
| JCM | NGR | 100 | narcotic | air | day | narcotics | 1300 |
| JCM | NGR | 200 | hallucin | air | day | hallucino | 1200 |
| JCM | NGR | 250 | cannabis | sea | day | marijuana | 1100 |
| JCM | NGR | 300 | depressa | air | day | depressan | 900 |
| JCM | NGR | 300 | depressa | sea | day | depressan | 1100 |
| JCM | NGR | 300 | stimulan | air | day | cocaine | 900 |
| JCM | NGR | 350 | hallucin | sea | night | hallucino | 2000 |
| JCM | NGR | 350 | narcotic | sea | day | morphine | 1000 |
| JCM | NGR | 400 | hallucin | sea | day | hallucino | 1300 |
| JCM | NGR | 450 | stimulan | sea | day | cocaine | 900 |
| JCM | NGR | 500 | cannabis | air | day | marijuana | 1200 |
| JCM | NGR | 500 | depressa | air | night | depressan | 2400 |
| JCM | NGR | 500 | depressa | sea | night | depressan | 2400 |
| JCM | NGR | 750 | cannabis | sea | night | marijuana | 400 |
| JCM | NGR | 790 | narcotic | sea | night | morphine | 100 |
| JCM | NGR | 900 | narcotic | air | night | morphine | 2400 |
| JCM | NGR | 1000 | cannabis | air | night | marijuana | 2300 |
| JCM | NGR | 1000 | cannabis | sea | day | marijuana | 1000 |
| JCM | NGR | 1000 | cannabis | sea | night | marijuana | 300 |
| JCM | NGR | 1000 | depressa | air | night | depressan | 2300 |
| JCM | NGR | 1000 | depressa | sea | day | depressan | 1000 |
| JCM | NGR | 1000 | depressa | sea | night | depressan | 2300 |
| JCM | NGR | 1000 | hallucin | air | night | hallucino | 400 |

| | | | | | | | |
|---|---|---|---|---|---|---|---|
| JCM | NGR | 1000 | hallucin | sea | day | hallucino | 1200 |
| JCM | NGR | 1000 | hallucin | sea | night | hallucino | 1900 |
| JCM | NGR | 1000 | narcotic | air | day | heroin | 1100 |
| JCM | NGR | 1000 | narcotic | air | day | morphine | 1200 |
| JCM | NGR | 1000 | narcotic | air | night | heroin | 2300 |
| JCM | NGR | 1000 | narcotic | sea | day | heroin | 800 |
| JCM | NGR | 1000 | narcotic | sea | night | heroin | 2400 |
| JCM | NGR | 1000 | stimulan | air | night | cocaine | 400 |
| JCM | NGR | 1000 | stimulan | sea | day | cocaine | 800 |
| JCM | NGR | 1100 | stimulan | air | night | cocaine | 500 |
| JCM | NGR | 1100 | stimulan | sea | night | cocaine | 400 |
| JCM | NGR | 1150 | hallucin | air | night | hallucino | 300 |
| JCM | NGR | 1500 | cannabis | air | night | marijuana | 2200 |
| JCM | NGR | 2000 | stimulan | air | night | cocaine | 300 |
| JCM | NGR | 2000 | stimulan | sea | night | cocaine | 200 |
| JCM | NGR | 2000 | stimulan | sea | night | cocaine | 300 |
| LPZ | STR | 500 | narcotic | groun | day | narcotics | 1500 |
| LPZ | STR | 500 | stimulan | sea | night | stimulana | 500 |
| LPZ | STR | 1000 | narcotic | sea | night | morphine | 30 |
| LPZ | STR | 1500 | cannabis | air | day | cannabis | 1256 |
| LPZ | STR | 1500 | cannabis | sea | night | marijuana | 30 |
| LPZ | STR | 1500 | stimulan | sea | night | stimulana | 30 |
| LPZ | STR | 1500 | stimulan | sea | night | stimulana | 130 |
| LPZ | STR | 2000 | narcotic | sea | night | narcotics | 30 |
| LPZ | STR | 2500 | narcotic | air | day | heroin | 1430 |
| LPZ | STR | 2500 | narcotic | air | night | morphine | 130 |
| MCB | JCM | 900 | cannabis | air | day | marijuana | 900 |
| MCB | JCM | 900 | cannabis | air | night | marijuana | 400 |
| MCB | JCM | 1000 | narcotic | sea | day | heroin | 700 |
| MCB | JCM | 1000 | narcotic | sea | day | morphine | 900 |
| MCB | JCM | 1000 | narcotic | sea | night | heroin | 300 |
| MCB | JCM | 1000 | narcotic | sea | night | morphine | 400 |
| MCB | JCM | 1000 | narcotic | sea | night | narcotics | 500 |
| MCB | JCM | 1000 | stimulan | air | day | cocaine | 1100 |
| MCB | JCM | 1000 | stimulan | air | day | stimulana | 1300 |
| MCB | JCM | 1500 | narcotic | sea | day | narcotics | 1000 |
| MCB | JCM | 1650 | narcotic | sea | night | narcotics | 200 |
| MCB | JCM | 2000 | cannabis | air | night | hemp | 300 |
| MCB | JCM | 2000 | narcotic | sea | night | heroin | 550 |
| MCB | JCM | 2000 | stimulan | air | day | cocaine | 1000 |
| MCB | JCM | 3000 | stimulan | air | day | cocaine | 900 |
| MCB | JCM | 5000 | stimulan | air | night | cocaine | 400 |
| MCB | JCM | 6000 | stimulan | air | day | cocaine | 800 |
| MCB | JCM | 8000 | stimulan | air | night | cocaine | 300 |
| MZL | NRJ | 100 | cannabis | air | day | marijuana | 909 |
| MZL | NRJ | 100 | narcotic | air | night | heroin | 100 |
| MZL | NRJ | 100 | narcotic | groun | day | heroin | 800 |
| MZL | NRJ | 100 | narcotic | groun | day | morphine | 700 |
| MZL | NRJ | 200 | narcotic | air | day | narcotics | 1000 |
| MZL | NRJ | 200 | narcotic | groun | day | narcotics | 800 |
| MZL | NRJ | 200 | narcotic | groun | night | heroin | 2300 |
| MZL | NRJ | 200 | narcotic | groun | night | morphine | 2300 |

| | | | | | | | | |
|---|---|---|---|---|---|---|---|---|
| MZL | NRJ | 200 | narcotic | groun | night | narcotics | 2300 |
| MZL | NRJ | 300 | cannabis | air | day | hashish | 700 |
| MZL | NRJ | 300 | cannabis | air | day | hemp | 700 |
| MZL | NRJ | 300 | cannabis | air | day | marijuana | 710 |
| MZL | NRJ | 300 | narcotic | air | night | morphine | 2300 |
| MZL | NRJ | 300 | narcotic | air | night | narcotics | 0 |
| MZL | NRJ | 300 | narcotic | air | night | narcotics | 100 |
| MZL | NRJ | 300 | stimulan | air | night | cocaine | 102 |
| MZL | NRJ | 300 | stimulan | air | night | cocaine | 304 |
| MZL | NRJ | 300 | stimulan | air | night | stimulana | 1 |
| MZL | NRJ | 300 | stimulan | air | night | stimulana | 203 |
| MZL | NRJ | 300 | stimulan | air | night | stimulana | 405 |
| MZL | NRJ | 300 | stimulan | groun | night | cocaine | 557 |
| MZL | NRJ | 500 | stimulan | air | day | cocaine | 630 |
| MZL | NRJ | 500 | stimulan | air | day | cocaine | 900 |
| MZL | NRJ | 500 | stimulan | air | day | stimulana | 630 |
| MZL | NRJ | 500 | stimulan | air | day | stimulana | 900 |
| MZL | NRJ | 500 | stimulan | groun | day | cocaine | 606 |
| MZL | NRJ | 600 | narcotic | air | day | heroin | 627 |
| MZL | NRJ | 800 | narcotic | air | day | heroin | 900 |
| MZL | NRJ | 800 | narcotic | air | day | morphine | 700 |
| MZL | NRJ | 800 | narcotic | air | day | narcotics | 600 |
| MZL | NRJ | 800 | narcotic | air | day | narcotics | 800 |
| MZL | TDS | 200 | cannabis | sea | day | marijuana | 1200 |
| MZL | TDS | 200 | cannabis | sea | day | marijuana | 1300 |
| MZL | TDS | 250 | stimulan | sea | day | stimulana | 613 |
| MZL | TDS | 250 | stimulan | sea | day | stimulana | 800 |
| MZL | TDS | 300 | narcotic | sea | night | heroin | 100 |
| MZL | TDS | 300 | narcotic | sea | night | heroin | 200 |
| MZL | TDS | 350 | stimulan | sea | night | stimulana | 400 |
| MZL | TDS | 350 | stimulan | sea | night | stimulana | 2330 |
| MZL | TDS | 400 | cannabis | sea | day | marijuana | 1100 |
| MZL | TDS | 400 | narcotic | sea | day | heroin | 610 |
| MZL | TDS | 400 | narcotic | sea | day | heroin | 800 |
| MZL | TDS | 400 | narcotic | sea | day | heroin | 948 |
| MZL | TDS | 400 | narcotic | sea | day | heroin | 1414 |
| MZL | TDS | 400 | narcotic | sea | day | morphine | 1111 |
| MZL | TDS | 400 | narcotic | sea | night | narcotics | 500 |
| MZL | TDS | 800 | cannabis | sea | day | cannabis | 700 |
| MZL | TDS | 800 | cannabis | sea | day | hashish | 900 |
| MZL | TDS | 800 | cannabis | sea | day | hemp | 800 |
| MZL | TDS | 800 | cannabis | sea | day | marijuana | 900 |
| MZL | TDS | 800 | cannabis | sea | day | marijuana | 1000 |
| MZL | TDS | 1000 | narcotic | air | day | heroin | 610 |
| MZL | TDS | 1000 | narcotic | air | day | morphine | 1200 |
| MZL | TDS | 1000 | narcotic | air | day | narcotics | 800 |
| MZL | TDS | 1000 | narcotic | air | night | narcotics | 530 |
| MZL | TDS | 1500 | stimulan | sea | night | cocaine | 400 |
| MZL | TDS | 1500 | stimulan | sea | night | cocaine | 2330 |
| MZL | TDS | 2000 | stimulan | sea | day | cocaine | 613 |
| MZL | TDS | 2000 | stimulan | sea | day | cocaine | 800 |
| MZL | TDS | 8000 | narcotic | sea | day | heroin | 900 |

| | | | | | | | |
|---|---|---|---|---|---|---|---|
| NGR | PJZ | 100 | narcotic | air | day | morphine | 1400 |
| NGR | PJZ | 500 | cannabis | air | day | marijuana | 1200 |
| NGR | PJZ | 500 | cannabis | air | day | marijuana | 1300 |
| NGR | PJZ | 600 | stimulan | sea | night | cocaine | 555 |
| NGR | PJZ | 700 | cannabis | sea | day | marijuana | 1200 |
| NGR | PJZ | 700 | cannabis | sea | day | marijuana | 1300 |
| NGR | PJZ | 700 | cannabis | sea | night | marijuana | 400 |
| NGR | PJZ | 1000 | cannabis | sea | night | marijuana | 300 |
| NGR | PJZ | 1000 | narcotic | air | day | heroin | 1200 |
| NGR | PJZ | 1000 | stimulan | sea | day | cocaine | 900 |
| NGR | PJZ | 1360 | stimulan | sea | day | cocaine | 945 |
| NGR | PJZ | 2000 | narcotic | sea | day | heroin | 1100 |
| NGR | PJZ | 2000 | narcotic | sea | night | heroin | 2100 |
| NGR | PJZ | 2000 | stimulan | sea | night | cocaine | 345 |
| NGR | PJZ | 2000 | stimulan | sea | night | cocaine | 550 |
| NGR | PJZ | 2130 | narcotic | sea | night | morphine | 2200 |
| NGR | PJZ | 2500 | stimulan | sea | night | cocaine | 450 |
| NGR | PJZ | 3000 | narcotic | sea | day | morphine | 1130 |
| NRJ | LUX | 200 | narcotic | air | night | narcotics | 2000 |
| NRJ | LUX | 200 | stimulan | air | night | cocaine | 500 |
| NRJ | LUX | 300 | cannabis | air | night | cannabis | 400 |
| NRJ | LUX | 300 | cannabis | sea | night | marijuana | 200 |
| NRJ | LUX | 300 | narcotic | air | night | heroin | 2000 |
| NRJ | LUX | 300 | narcotic | air | night | morphine | 200 |
| NRJ | LUX | 300 | narcotic | air | night | narcotics | 200 |
| NRJ | LUX | 400 | cannabis | groun | day | hashish | 1200 |
| NRJ | LUX | 400 | narcotic | groun | night | morphine | 100 |
| NRJ | LUX | 430 | stimulan | sea | night | stimulana | 400 |
| NRJ | LUX | 430 | stimulan | sea | night | stimulana | 500 |
| NRJ | LUX | 440 | stimulan | sea | night | cocaine | 500 |
| NRJ | LUX | 500 | narcotic | groun | night | heroin | 100 |
| NRJ | LUX | 500 | narcotic | sea | night | heroin | 515 |
| NRJ | LUX | 500 | narcotic | sea | night | morphine | 500 |
| NRJ | LUX | 700 | stimulan | air | night | cocaine | 200 |
| NRJ | LUX | 700 | stimulan | air | night | cocaine | 400 |
| NRJ | LUX | 700 | stimulan | air | night | stimulana | 200 |
| NRJ | LUX | 700 | stimulan | air | night | stimulana | 400 |
| NRJ | LUX | 1000 | narcotic | sea | day | heroin | 645 |
| NRJ | LUX | 1000 | narcotic | sea | day | morphine | 645 |
| NRJ | LUX | 1000 | narcotic | sea | day | narcotics | 645 |
| PCR | MCB | 1000 | stimulan | air | day | cocaine | 600 |
| PCR | MCB | 1000 | stimulan | air | day | cocaine | 601 |
| PCR | MCB | 1000 | stimulan | air | day | cocaine | 602 |
| PCR | MCB | 1000 | stimulan | air | night | cocaine | 440 |
| PCR | MCB | 2000 | stimulan | air | night | cocaine | 400 |
| PCR | MCB | 2000 | stimulan | air | night | cocaine | 401 |
| PCR | MCB | 2000 | stimulan | air | night | cocaine | 402 |
| PCR | MCB | 2000 | stimulan | air | night | cocaine | 403 |
| PCR | MCB | 2000 | stimulan | air | night | cocaine | 404 |
| PCR | MCB | 3000 | stimulan | air | night | cocaine | 430 |
| PCR | MCB | 3000 | stimulan | air | night | cocaine | 435 |
| PCR | URB | 500 | hallucin | air | night | hallucino | 200 |

| | | | | | | | |
|---|---|---|---|---|---|---|---|
| PCR | URB | 1000 | cannabis | air | day | marijuana | 1200 |
| PCR | URB | 1000 | cannabis | air | night | marijuana | 400 |
| PCR | URB | 1000 | cannabis | air | night | marijuana | 401 |
| PCR | URB | 1000 | cannabis | air | night | marijuana | 402 |
| PCR | URB | 1000 | hallucin | air | night | hallucino | 2400 |
| PCR | URB | 1000 | narcotic | air | day | narcotics | 1200 |
| PCR | URB | 1000 | narcotic | air | night | heroin | 200 |
| PCR | URB | 1000 | narcotic | air | night | morphine | 300 |
| PCR | URB | 1000 | stimulan | air | day | cocaine | 1200 |
| PCR | URB | 1000 | stimulan | air | day | cocaine | 1202 |
| PCR | URB | 1000 | stimulan | air | day | cocaine | 1203 |
| PCR | URB | 1000 | stimulan | air | day | cocaine | 1204 |
| PCR | URB | 1000 | stimulan | air | day | cocaine | 1205 |
| PCR | URB | 1300 | cannabis | air | night | marijuana | 403 |
| PCR | URB | 2000 | narcotic | air | night | narcotics | 302 |
| PCR | URB | 3000 | stimulan | air | night | cocaine | 400 |
| PCR | URB | 3000 | stimulan | air | night | cocaine | 401 |
| PCR | URB | 3000 | stimulan | air | night | cocaine | 402 |
| PCR | URB | 3000 | stimulan | air | night | cocaine | 403 |
| PCR | URB | 3000 | stimulan | air | night | cocaine | 404 |
| PCR | URB | 3000 | stimulan | air | night | cocaine | 405 |
| PCR | URB | 3000 | stimulan | air | night | cocaine | 406 |
| PJZ | LUX | 100 | cannabis | air | day | marijuana | 1200 |
| PJZ | LUX | 100 | narcotic | sea | day | heroin | 1200 |
| PJZ | LUX | 100 | narcotic | sea | day | morphine | 1300 |
| PJZ | LUX | 150 | stimulan | air | day | cocaine | 1200 |
| PJZ | LUX | 200 | narcotic | air | night | heroin | 430 |
| PJZ | LUX | 200 | stimulan | sea | day | cocaine | 1000 |
| PJZ | LUX | 300 | narcotic | air | day | heroin | 800 |
| PJZ | LUX | 300 | narcotic | air | day | morphine | 900 |
| PJZ | LUX | 300 | narcotic | sea | night | morphine | 400 |
| PJZ | LUX | 400 | cannabis | air | day | marijuana | 1300 |
| PJZ | LUX | 400 | narcotic | air | day | narcotics | 700 |
| PJZ | LUX | 400 | narcotic | air | night | narcotics | 500 |
| PJZ | LUX | 500 | cannabis | air | night | marijuana | 200 |
| PJZ | LUX | 500 | cannabis | air | night | marijuana | 300 |
| PJZ | LUX | 500 | cannabis | air | night | marijuana | 400 |
| PJZ | LUX | 500 | depressa | sea | day | depressan | 1300 |
| PJZ | LUX | 500 | hallucin | air | night | hallucino | 2400 |
| PJZ | LUX | 600 | narcotic | air | night | heroin | 300 |
| PJZ | LUX | 800 | narcotic | air | night | morphine | 400 |
| PJZ | LUX | 1000 | cannabis | sea | day | hashish | 1530 |
| PJZ | LUX | 1000 | cannabis | sea | day | marijuana | 1400 |
| PJZ | LUX | 1000 | cannabis | sea | day | marijuana | 1500 |
| PJZ | LUX | 1000 | cannabis | sea | day | marijuana | 1600 |
| PJZ | LUX | 1000 | cannabis | sea | night | marijuana | 2200 |
| PJZ | LUX | 1000 | depressa | sea | day | depressan | 1200 |
| PJZ | LUX | 1000 | depressa | sea | night | depressan | 2000 |
| PJZ | LUX | 1000 | depressa | sea | night | depressan | 2200 |
| PJZ | LUX | 1000 | depressa | sea | night | depressan | 2300 |
| PJZ | LUX | 1000 | hallucin | air | night | hallucino | 2300 |
| PJZ | LUX | 1000 | hallucin | sea | night | hallucino | 100 |

| | | | | | | | |
|---|---|---|---|---|---|---|---|
| PJZ | LUX | 1000 | hallucin | sea | night | hallucino | 2300 |
| PJZ | LUX | 1000 | hallucin | sea | night | hallucino | 2400 |
| PJZ | LUX | 1000 | narcotic | sea | night | heroin | 300 |
| PJZ | LUX | 1000 | stimulan | air | night | cocaine | 200 |
| PJZ | LUX | 1000 | stimulan | air | night | cocaine | 300 |
| PJZ | LUX | 1000 | stimulan | air | night | cocaine | 400 |
| PJZ | LUX | 1000 | stimulan | sea | night | cocaine | 100 |
| PJZ | LUX | 1000 | stimulan | sea | night | cocaine | 2400 |
| PJZ | LUX | 1500 | stimulan | sea | night | cocaine | 200 |
| PJZ | LUX | 2000 | cannabis | sea | night | marijuana | 1900 |
| PJZ | LUX | 2000 | cannabis | sea | night | marijuana | 2000 |
| PJZ | LUX | 2000 | cannabis | sea | night | marijuana | 2100 |
| PJZ | LUX | 2000 | narcotic | air | night | narcotics | 300 |
| PJZ | MIA | 50 | stimulan | sea | day | stimulana | 900 |
| PJZ | MIA | 100 | cannabis | air | day | marijuana | 1500 |
| PJZ | MIA | 100 | cannabis | air | day | marijuana | 1600 |
| PJZ | MIA | 100 | cannabis | sea | day | marijuana | 700 |
| PJZ | MIA | 100 | stimulan | air | night | cocaine | 400 |
| PJZ | MIA | 100 | stimulan | air | night | cocaine | 500 |
| PJZ | MIA | 100 | stimulan | sea | day | stimulana | 800 |
| PJZ | MIA | 150 | hallucin | air | night | hallucino | 330 |
| PJZ | MIA | 200 | cannabis | air | night | marijuana | 400 |
| PJZ | MIA | 200 | cannabis | air | night | marijuana | 410 |
| PJZ | MIA | 200 | cannabis | air | night | marijuana | 420 |
| PJZ | MIA | 200 | cannabis | air | night | marijuana | 430 |
| PJZ | MIA | 200 | cannabis | air | night | marijuana | 440 |
| PJZ | MIA | 200 | cannabis | air | night | marijuana | 450 |
| PJZ | MIA | 200 | cannabis | air | night | marijuana | 500 |
| PJZ | MIA | 200 | cannabis | sea | day | marijuana | 620 |
| PJZ | MIA | 200 | cannabis | sea | night | marijuana | 1800 |
| PJZ | MIA | 200 | cannabis | sea | night | marijuana | 1830 |
| PJZ | MIA | 200 | hallucin | sea | night | hallucino | 330 |
| PJZ | MIA | 200 | narcotic | air | day | heroin | 630 |
| PJZ | MIA | 200 | narcotic | air | day | narcotics | 700 |
| PJZ | MIA | 230 | hallucin | sea | night | hallucino | 400 |
| PJZ | MIA | 300 | cannabis | air | night | marijuana | 510 |
| PJZ | MIA | 300 | depressa | sea | night | depressan | 400 |
| PJZ | MIA | 300 | hallucin | air | night | hallucino | 300 |
| PJZ | MIA | 300 | hallucin | air | night | hallucino | 400 |
| PJZ | MIA | 300 | narcotic | sea | night | narcotics | 230 |
| PJZ | MIA | 500 | narcotic | sea | night | narcotics | 200 |
| PJZ | MIA | 500 | narcotic | sea | night | narcotics | 300 |
| PJZ | MIA | 500 | stimulan | sea | night | cocaine | 300 |
| PJZ | MIA | 500 | stimulan | sea | night | cocaine | 345 |
| PJZ | MIA | 500 | stimulan | sea | night | cocaine | 440 |
| PJZ | MIA | 500 | stimulan | sea | night | cocaine | 450 |
| PJZ | MIA | 600 | narcotic | air | day | morphine | 650 |
| PJZ | MIA | 600 | stimulan | sea | night | cocaine | 515 |
| PJZ | MIA | 1000 | stimulan | sea | night | cocaine | 500 |
| PJZ | MIA | 1500 | stimulan | sea | night | cocaine | 515 |
| STR | CJZ | 300 | depressa | air | day | depressan | 1000 |
| STR | CJZ | 400 | hallucin | groun | day | hallucino | 957 |

| | | | | | | | |
|---|---|---|---|---|---|---|---|
| STR | CJZ | 500 | cannabis | groun | day | hemp | 1400 |
| STR | CJZ | 500 | hallucin | air | day | hallucino | 1048 |
| STR | CJZ | 500 | hallucin | air | night | hallucino | 123 |
| STR | CJZ | 500 | hallucin | air | night | hallucino | 2200 |
| STR | CJZ | 500 | narcotic | groun | day | morphine | 1212 |
| STR | CJZ | 600 | narcotic | groun | night | morphine | 230 |
| STR | CJZ | 600 | narcotic | groun | night | narcotics | 230 |
| STR | CJZ | 700 | depressa | air | night | depressan | 2222 |
| STR | CJZ | 1000 | cannabis | air | day | cannabis | 909 |
| STR | CJZ | 1000 | cannabis | groun | night | cannabis | 2200 |
| STR | CJZ | 1000 | cannabis | groun | night | hemp | 2340 |
| STR | CJZ | 1000 | depressa | air | night | depressan | 2000 |
| STR | CJZ | 1000 | hallucin | groun | night | hallucino | 1 |
| STR | CJZ | 1000 | narcotic | air | day | narcotics | 950 |
| STR | CJZ | 1000 | narcotic | air | night | heroin | 101 |
| STR | CJZ | 1000 | narcotic | air | night | morphine | 230 |
| STR | CJZ | 1300 | depressa | groun | day | depressan | 936 |
| STR | CJZ | 1500 | depressa | groun | night | depressan | 2323 |
| STR | CJZ | 1700 | depressa | groun | day | depressan | 700 |
| STR | CJZ | 2000 | cannabis | air | night | hashish | 2200 |
| STR | CJZ | 2500 | depressa | groun | night | depressan | 2121 |
| STR | CJZ | 3000 | cannabis | air | night | marijuana | 2200 |
| STR | CJZ | 3000 | hallucin | groun | night | hallucino | 123 |
| STR | CJZ | 3000 | hallucin | groun | night | hallucino | 234 |
| STR | CJZ | 3000 | hallucin | groun | night | hallucino | 2345 |
| STR | CJZ | 3000 | stimulan | groun | night | stimulana | 530 |
| STR | CJZ | 3500 | stimulan | groun | night | stimulana | 330 |
| STR | CJZ | 3500 | stimulan | groun | night | stimulana | 2359 |
| TDS | LPZ | 400 | narcotic | air | day | narcotics | 1200 |
| TDS | LPZ | 400 | stimulan | groun | night | stimulana | 2345 |
| TDS | LPZ | 500 | narcotic | air | night | narcotics | 202 |
| TDS | LPZ | 500 | stimulan | air | day | cocaine | 800 |
| TDS | LPZ | 600 | narcotic | air | day | morphine | 1200 |
| TDS | LPZ | 600 | stimulan | groun | night | cocaine | 2345 |
| TDS | LPZ | 1000 | narcotic | groun | day | narcotics | 1100 |
| TDS | LPZ | 1000 | narcotic | groun | night | morphine | 2200 |
| TDS | LPZ | 1000 | narcotic | groun | night | narcotics | 2200 |
| TDS | LPZ | 1000 | stimulan | groun | day | cocaine | 1010 |
| TDS | LPZ | 1000 | stimulan | groun | day | stimulana | 800 |
| TDS | LPZ | 1500 | cannabis | air | day | hashish | 1414 |
| TDS | LPZ | 1500 | cannabis | air | day | hemp | 1400 |
| TDS | LPZ | 2000 | narcotic | groun | day | heroin | 1200 |
| TDS | LPZ | 2000 | narcotic | groun | day | morphine | 1300 |
| TDS | TJA | 100 | stimulan | sea | night | stimulana | 200 |
| TDS | TJA | 300 | stimulan | sea | night | cocaine | 100 |
| TDS | TJA | 300 | stimulan | sea | night | cocaine | 200 |
| TDS | TJA | 300 | stimulan | sea | night | stimulana | 100 |
| TDS | TJA | 500 | narcotic | sea | day | heroin | 1400 |
| TDS | TJA | 500 | narcotic | sea | day | morphine | 1330 |
| TDS | TJA | 500 | narcotic | sea | day | morphine | 1400 |
| TDS | TJA | 600 | cannabis | sea | night | cannabis | 244 |
| TDS | TJA | 600 | cannabis | sea | night | hemp | 244 |

| | | | | | | | |
|---|---|---|---|---|---|---|---|
| TDS | TJA | 600 | cannabis | sea | night | marijuana | 244 |
| TDS | TJA | 600 | narcotic | sea | night | heroin | 500 |
| TDS | TJA | 700 | narcotic | groun | day | narcotics | 1228 |
| TDS | TJA | 800 | narcotic | sea | night | morphine | 500 |
| TDS | TJA | 800 | narcotic | sea | night | narcotics | 400 |
| TDS | TJA | 800 | narcotic | sea | night | narcotics | 500 |
| TJA | BOI | 100 | narcotic | air | day | narcotics | 1212 |
| TJA | BOI | 200 | cannabis | groun | day | marijuana | 1300 |
| TJA | BOI | 470 | stimulan | groun | night | stimulana | 300 |
| TJA | BOI | 500 | cannabis | air | night | cannabis | 1 |
| TJA | BOI | 500 | cannabis | groun | night | marijuana | 200 |
| TJA | BOI | 500 | stimulan | air | night | stimulana | 2200 |
| TJA | BOI | 600 | cannabis | groun | night | cannabis | 2350 |
| TJA | BOI | 1000 | depressa | groun | night | depressan | 330 |
| TJA | BOI | 1500 | hallucin | air | night | hallucino | 500 |
| TJA | BOI | 1515 | stimulan | groun | night | stimulana | 0 |
| TJA | BOI | 1515 | stimulan | groun | night | stimulana | 245 |
| TJA | BOI | 2000 | depressa | air | night | depressan | 230 |
| TJA | BOI | 2000 | depressa | groun | night | depressan | 101 |
| TJA | BOI | 2000 | narcotic | air | night | morphine | 300 |
| TJA | BOI | 2000 | narcotic | groun | night | narcotics | 548 |
| TJA | BOI | 3000 | narcotic | air | night | heroin | 430 |
| TJA | BOI | 5000 | hallucin | groun | night | hallucino | 200 |
| TJA | BOI | 5000 | hallucin | groun | night | hallucino | 300 |
| TJA | BOI | 5000 | hallucin | groun | night | hallucino | 400 |
| TJA | BOI | 5000 | hallucin | groun | night | hallucino | 500 |
| URB | CAI | 500 | cannabis | air | day | hemp | 830 |
| URB | CAI | 500 | cannabis | air | day | marijuana | 800 |
| URB | CAI | 500 | hallucin | sea | night | hallucino | 530 |
| URB | CAI | 500 | narcotic | air | day | heroin | 800 |
| URB | CAI | 500 | narcotic | air | day | morphine | 900 |
| URB | CAI | 500 | narcotic | air | night | narcotics | 300 |
| URB | CAI | 500 | narcotic | sea | day | narcotics | 900 |
| URB | CAI | 1000 | cannabis | air | night | hemp | 430 |
| URB | CAI | 1000 | cannabis | air | night | marijuana | 400 |
| URB | CAI | 1000 | cannabis | sea | night | hemp | 430 |
| URB | CAI | 1000 | hallucin | sea | night | hallucino | 500 |
| URB | CAI | 1000 | narcotic | sea | night | heroin | 100 |
| URB | CAI | 1000 | narcotic | sea | night | morphine | 200 |
| URB | CAI | 1000 | narcotic | sea | night | narcotics | 300 |
| URB | CAI | 1000 | stimulan | air | day | cocaine | 700 |
| URB | CAI | 1000 | stimulan | air | day | cocaine | 710 |
| URB | CAI | 1000 | stimulan | air | day | cocaine | 715 |
| URB | CAI | 1000 | stimulan | air | day | cocaine | 720 |
| URB | CAI | 1000 | stimulan | air | day | cocaine | 725 |
| URB | CAI | 1000 | stimulan | air | night | cocaine | 500 |
| URB | CAI | 1000 | stimulan | air | night | cocaine | 510 |
| URB | CAI | 1000 | stimulan | air | night | cocaine | 515 |
| URB | CAI | 1000 | stimulan | air | night | cocaine | 520 |
| URB | CAI | 1000 | stimulan | sea | day | cocaine | 1203 |
| URB | CAI | 1000 | stimulan | sea | night | cocaine | 203 |
| URB | CAI | 1300 | cannabis | sea | night | marijuana | 400 |

| | | | | | | | |
|---|---|---|---|---|---|---|---|
| URB | CAI | 2000 | stimulan | sea | day | cocaine | 1200 |
| URB | CAI | 2000 | stimulan | sea | day | cocaine | 1201 |
| URB | CAI | 2000 | stimulan | sea | day | cocaine | 1202 |
| URB | CAI | 3000 | stimulan | sea | night | cocaine | 200 |
| URB | CAI | 3000 | stimulan | sea | night | cocaine | 201 |
| URB | CAI | 3000 | stimulan | sea | night | cocaine | 202 |

```
/* The aggregated records the analyst wishes to make
are the flow of drugs on each arc by drug category,
mode of sahipment, and time of day.  The INGRES
query performed by IDEA is strightforward. */


set s shipments

ret into drugflow (
  origin = s.origin,
  destination = s.destination,
  total = sum ( s.amount by s.origin, s.destination,
                s.category, s.mode, s.day ),
  category = s.category,
  mode = s.mode,
  day = s.day )


print drugflow
```

drugflow relation

| origin | destin | total | category | mode | day |
|---|---|---|---|---|---|
| BAH | MIA | 1000 | cannabis | air | day |
| BAH | MIA | 2000 | cannabis | air | night |
| BAH | MIA | 1500 | cannabis | sea | day |
| BAH | MIA | 3100 | cannabis | sea | night |
| BAH | MIA | 1150 | hallucinogens | air | night |
| BAH | MIA | 2100 | hallucinogens | sea | night |
| BAH | MIA | 1000 | narcotics | air | day |
| BAH | MIA | 2000 | narcotics | air | night |
| BAH | MIA | 200 | narcotics | sea | day |
| BAH | MIA | 2100 | narcotics | sea | night |
| BAH | MIA | 300 | stimulants | air | night |
| BAH | MIA | 4000 | stimulants | sea | night |
| CAI | MIA | 150 | cannabis | air | day |
| CAI | MIA | 1500 | cannabis | air | night |
| CAI | MIA | 2100 | cannabis | sea | day |
| CAI | MIA | 3100 | cannabis | sea | night |
| CAI | MIA | 3000 | depressants | sea | night |
| CAI | MIA | 1170 | hallucinogens | air | night |
| CAI | MIA | 1560 | hallucinogens | sea | night |
| CAI | MIA | 1600 | narcotics | sea | night |

| | | | | | |
|---|---|---|---|---|---|
| CAI | MIA | 3000 | stimulants | sea | night |
| CAL | GLP | 2000 | cannabis | sea | day |
| CAL | GLP | 3800 | cannabis | sea | night |
| CAL | GLP | 7000 | narcotics | air | day |
| CAL | GLP | 8000 | narcotics | air | night |
| CAL | GLP | 3000 | narcotics | sea | day |
| CAL | GLP | 4000 | narcotics | sea | night |
| CAL | GLP | 5000 | stimulants | air | night |
| CAL | GLP | 13000 | stimulants | sea | night |
| CJZ | CDR | 100 | cannabis | air | day |
| CJZ | CDR | 7000 | depressants | air | day |
| CJZ | CDR | 7000 | depressants | air | night |
| CJZ | CDR | 7000 | depressants | ground | day |
| CJZ | CDR | 7000 | depressants | ground | night |
| CJZ | CDR | 150 | hallucinogens | air | night |
| CJZ | CDR | 200 | hallucinogens | ground | night |
| CJZ | CDR | 100 | narcotics | air | day |
| CJZ | CDR | 200 | narcotics | ground | night |
| CMN | CAL | 1000 | cannabis | air | day |
| CMN | CAL | 1500 | cannabis | air | night |
| CMN | CAL | 1300 | cannabis | ground | day |
| CMN | CAL | 2000 | cannabis | ground | night |
| CMN | CAL | 1000 | narcotics | air | day |
| CMN | CAL | 17000 | narcotics | air | night |
| CMN | CAL | 1500 | narcotics | ground | day |
| CMN | CAL | 2500 | narcotics | ground | night |
| CMN | CAL | 10000 | stimulants | air | day |
| CMN | CAL | 8000 | stimulants | air | night |
| CMN | MCB | 2000 | cannabis | air | day |
| CMN | MCB | 1800 | cannabis | air | night |
| CMN | MCB | 2050 | narcotics | air | day |
| CMN | MCB | 2000 | narcotics | air | night |
| CMN | MCB | 3000 | narcotics | ground | day |
| CMN | MCB | 3100 | narcotics | ground | night |
| CMN | MCB | 1000 | stimulants | air | day |
| CMN | MCB | 5000 | stimulants | air | night |
| GLP | MZL | 5800 | cannabis | sea | day |
| GLP | MZL | 15000 | narcotics | air | day |
| GLP | MZL | 7000 | narcotics | sea | day |
| GLP | MZL | 4000 | stimulants | air | day |
| GLP | MZL | 14000 | stimulants | sea | day |
| JCM | NGR | 500 | cannabis | air | day |
| JCM | NGR | 2500 | cannabis | air | night |
| JCM | NGR | 1250 | cannabis | sea | day |
| JCM | NGR | 1750 | cannabis | sea | night |
| JCM | NGR | 300 | depressants | air | day |
| JCM | NGR | 1500 | depressants | air | night |
| JCM | NGR | 1300 | depressants | sea | day |
| JCM | NGR | 1500 | depressants | sea | night |
| JCM | NGR | 200 | hallucinogens | air | day |
| JCM | NGR | 2150 | hallucinogens | air | night |
| JCM | NGR | 1400 | hallucinogens | sea | day |

| | | | | | |
|---|---|---|---|---|---|
| JCM | NGR | 1350 | hallucinogens | sea | night |
| JCM | NGR | 2100 | narcotics | air | day |
| JCM | NGR | 1900 | narcotics | air | night |
| JCM | NGR | 1350 | narcotics | sea | day |
| JCM | NGR | 1790 | narcotics | sea | night |
| JCM | NGR | 300 | stimulants | air | day |
| JCM | NGR | 4100 | stimulants | air | night |
| JCM | NGR | 1450 | stimulants | sea | day |
| JCM | NGR | 5100 | stimulants | sea | night |
| LPZ | STR | 1500 | cannabis | air | day |
| LPZ | STR | 1500 | cannabis | sea | night |
| LPZ | STR | 2500 | narcotics | air | day |
| LPZ | STR | 2500 | narcotics | air | night |
| LPZ | STR | 500 | narcotics | ground | day |
| LPZ | STR | 3000 | narcotics | sea | night |
| LPZ | STR | 3500 | stimulants | sea | night |
| MCB | JCM | 900 | cannabis | air | day |
| MCB | JCM | 2900 | cannabis | air | night |
| MCB | JCM | 3500 | narcotics | sea | day |
| MCB | JCM | 6650 | narcotics | sea | night |
| MCB | JCM | 13000 | stimulants | air | day |
| MCB | JCM | 13000 | stimulants | air | night |
| MZL | NRJ | 1000 | cannabis | air | day |
| MZL | NRJ | 4000 | narcotics | air | day |
| MZL | NRJ | 1000 | narcotics | air | night |
| MZL | NRJ | 400 | narcotics | ground | day |
| MZL | NRJ | 600 | narcotics | ground | night |
| MZL | NRJ | 2000 | stimulants | air | day |
| MZL | NRJ | 1500 | stimulants | air | night |
| MZL | NRJ | 500 | stimulants | ground | day |
| MZL | NRJ | 300 | stimulants | ground | night |
| MZL | TDS | 4800 | cannabis | sea | day |
| MZL | TDS | 3000 | narcotics | air | day |
| MZL | TDS | 1000 | narcotics | air | night |
| MZL | TDS | 10000 | narcotics | sea | day |
| MZL | TDS | 1000 | narcotics | sea | night |
| MZL | TDS | 4500 | stimulants | sea | day |
| MZL | TDS | 3700 | stimulants | sea | night |
| NGR | PJZ | 1000 | cannabis | air | day |
| NGR | PJZ | 1400 | cannabis | sea | day |
| NGR | PJZ | 1700 | cannabis | sea | night |
| NGR | PJZ | 1100 | narcotics | air | day |
| NGR | PJZ | 5000 | narcotics | sea | day |
| NGR | PJZ | 4130 | narcotics | sea | night |
| NGR | PJZ | 2360 | stimulants | sea | day |
| NGR | PJZ | 7100 | stimulants | sea | night |
| NRJ | LUX | 300 | cannabis | air | night |
| NRJ | LUX | 400 | cannabis | ground | day |
| NRJ | LUX | 300 | cannabis | sea | night |
| NRJ | LUX | 1100 | narcotics | air | night |
| NRJ | LUX | 900 | narcotics | ground | night |
| NRJ | LUX | 3000 | narcotics | sea | day |

| | | | | | |
|---|---|---|---|---|---|
| NRJ | LUX | 1000 | narcotics | sea | night |
| NRJ | LUX | 3000 | stimulants | air | night |
| NRJ | LUX | 1300 | stimulants | sea | night |
| PCR | MCB | 3000 | stimulants | air | day |
| PCR | MCB | 17000 | stimulants | air | night |
| PCR | URB | 1000 | cannabis | air | day |
| PCR | URB | 4300 | cannabis | air | night |
| PCR | URB | 1500 | hallucinogens | air | night |
| PCR | URB | 1000 | narcotics | air | day |
| PCR | URB | 4000 | narcotics | air | night |
| PCR | URB | 5000 | stimulants | air | day |
| PCR | URB | 21000 | stimulants | air | night |
| PJZ | LUX | 500 | cannabis | air | day |
| PJZ | LUX | 1500 | cannabis | air | night |
| PJZ | LUX | 4000 | cannabis | sea | day |
| PJZ | LUX | 7000 | cannabis | sea | night |
| PJZ | LUX | 1500 | depressants | sea | day |
| PJZ | LUX | 3000 | depressants | sea | night |
| PJZ | LUX | 1500 | hallucinogens | air | night |
| PJZ | LUX | 3000 | hallucinogens | sea | night |
| PJZ | LUX | 1000 | narcotics | air | day |
| PJZ | LUX | 4000 | narcotics | air | night |
| PJZ | LUX | 200 | narcotics | sea | day |
| PJZ | LUX | 1300 | narcotics | sea | night |
| PJZ | LUX | 150 | stimulants | air | day |
| PJZ | LUX | 3000 | stimulants | air | night |
| PJZ | LUX | 200 | stimulants | sea | day |
| PJZ | LUX | 3500 | stimulants | sea | night |
| PJZ | MIA | 200 | cannabis | air | day |
| PJZ | MIA | 1700 | cannabis | air | night |
| PJZ | MIA | 300 | cannabis | sea | day |
| PJZ | MIA | 400 | cannabis | sea | night |
| PJZ | MIA | 300 | depressants | sea | night |
| PJZ | MIA | 750 | hallucinogens | air | night |
| PJZ | MIA | 430 | hallucinogens | sea | night |
| PJZ | MIA | 1000 | narcotics | air | day |
| PJZ | MIA | 1300 | narcotics | sea | night |
| PJZ | MIA | 200 | stimulants | air | night |
| PJZ | MIA | 150 | stimulants | sea | day |
| PJZ | MIA | 5100 | stimulants | sea | night |
| STR | CJZ | 1000 | cannabis | air | day |
| STR | CJZ | 5000 | cannabis | air | night |
| STR | CJZ | 500 | cannabis | ground | day |
| STR | CJZ | 2000 | cannabis | ground | night |
| STR | CJZ | 300 | depressants | air | day |
| STR | CJZ | 1700 | depressants | air | night |
| STR | CJZ | 3000 | depressants | ground | day |
| STR | CJZ | 4000 | depressants | ground | night |
| STR | CJZ | 500 | hallucinogens | air | day |
| STR | CJZ | 1000 | hallucinogens | air | night |
| STR | CJZ | 400 | hallucinogens | ground | day |
| STR | CJZ | 10000 | hallucinogens | ground | night |

| | | | | | |
|---|---|---|---|---|---|
| STR | CJZ | 1000 | narcotics | air | day |
| STR | CJZ | 2000 | narcotics | air | night |
| STR | CJZ | 500 | narcotics | ground | day |
| STR | CJZ | 1200 | narcotics | ground | night |
| STR | CJZ | 10000 | stimulants | ground | night |
| TDS | LPZ | 3000 | cannabis | air | day |
| TDS | LPZ | 1000 | narcotics | air | day |
| TDS | LPZ | 500 | narcotics | air | night |
| TDS | LPZ | 5000 | narcotics | ground | day |
| TDS | LPZ | 2000 | narcotics | ground | night |
| TDS | LPZ | 500 | stimulants | air | day |
| TDS | LPZ | 2000 | stimulants | ground | day |
| TDS | LPZ | 1000 | stimulants | ground | night |
| TDS | TJA | 1800 | cannabis | sea | night |
| TDS | TJA | 700 | narcotics | ground | day |
| TDS | TJA | 1500 | narcotics | sea | day |
| TDS | TJA | 3000 | narcotics | sea | night |
| TDS | TJA | 1000 | stimulants | sea | night |
| TJA | BOI | 500 | cannabis | air | night |
| TJA | BOI | 200 | cannabis | ground | day |
| TJA | BOI | 1100 | cannabis | ground | night |
| TJA | BOI | 2000 | depressants | air | night |
| TJA | BOI | 3000 | depressants | ground | night |
| TJA | BOI | 1500 | hallucinogens | air | night |
| TJA | BOI | 20000 | hallucinogens | ground | night |
| TJA | BOI | 100 | narcotics | air | day |
| TJA | BOI | 5000 | narcotics | air | night |
| TJA | BOI | 2000 | narcotics | ground | night |
| TJA | BOI | 500 | stimulants | air | night |
| TJA | BOI | 3500 | stimulants | ground | night |
| URB | CAI | 1000 | cannabis | air | day |
| URB | CAI | 2000 | cannabis | air | night |
| URB | CAI | 2300 | cannabis | sea | night |
| URB | CAI | 1500 | hallucinogens | sea | night |
| URB | CAI | 1000 | narcotics | air | day |
| URB | CAI | 500 | narcotics | air | night |
| URB | CAI | 500 | narcotics | sea | day |
| URB | CAI | 3000 | narcotics | sea | night |
| URB | CAI | 5000 | stimulants | air | day |
| URB | CAI | 4000 | stimulants | air | night |
| URB | CAI | 7000 | stimulants | sea | day |
| URB | CAI | 10000 | stimulants | sea | night |

/* The fusion process is now complete. The IDEA System can pull the Geography Table for plotting information of the nodes and the Arcs Table for the arcs to be drawn. Select Criteria information comes from the drug Class relation and the various steps performed by INGRES and the Analyst during fusion. */

SOFTWARE LISTING

Copyright @ 1990, Rockwell International Corporation
All Rights Reserved

```
#include <stdio.h>

/* RUN-TIME VERSION */

/* Decomposing module for IDEA System - this module, given a        */
/* particular arc's origin-destination and pattern of criteria      */
/* currently selected by the user, retrieves the original data      */
/* records that were fuzed in the Ingres Database when the          */
/* graphical representation was built.  The main approach creates */
/* the Ingres Where-clause for the retrieve on the initial raw       */
/* data set based on the criteria currently selected in the         */
/* graphical portion of the system.                                 */


decompose(orig, dest, select_on)
char orig[];
char dest[];
int  select_on[5][8];
{

/* Variables that could be created elsewhere, and made available  */
/* here.                                                          */

int  num_criteria;
char *criteria[5];
int  num_selections[5];
char *selection[5][8];
char *type[5];
char *transvar[5];
char *transtable[5];
char title[20];          /*  Holder to reserve string space */


/* Local variables... */

int  count_crit, count_sels, sum_selects, OR_FLAG, hourcount;
char holder[200], blank[200], and_clause[10], or_clause[10];
char where_clause[500];
char *designator[5];     /* Used as the Ingres data table variable */
char *arguments[10]; /* Holder to receive each record from Ingres. */
FILE *fp, *fopen();
/* Needed functions - mostly for C string manipulation */

char      *strsave(), *stripped();


fp = fopen("/usr2/wxh/idea/IOFILES/HELPFILES/decompose.out", "w");
if(fp == NULL)
{
  printf("Error opening decompose.out for writing.\n");
  return;
}


/* Initialization for RUN-TIME version.                    */
/* ******************************************************** */
```

```
num_criteria = 3;
strcpy(title, "day");
criteria[0] = (char *) strsave( title);
strcpy(title, "mode");
criteria[1] = (char *) strsave(title);
strcpy(title, "category");
criteria[2] = (char *) strsave(title);

num_selections[0] = 2;
num_selections[1] = 3;
num_selections[2] = 5;

strcpy(title, "day");
selection[0][0] = (char *) strsave(title);
strcpy(title, "night");
selection[0][1] = (char *) strsave(title);
strcpy(title, "air");
selection[1][0] = (char *) strsave(title);
strcpy(title, "ground");
selection[1][1] = (char *) strsave(title);
strcpy(title, "sea");
selection[1][2] = (char *) strsave(title);
strcpy(title, "cannabis");
selection[2][0] = (char *) strsave(title);
strcpy(title, "depressants");
selection[2][1] = (char *) strsave(title);
strcpy(title, "hallucinogens");
selection[2][2] = (char *) strsave(title);
strcpy(title, "narcotics");
selection[2][3] = (char *) strsave(title);
strcpy(title, "stimulants");
selection[2][4] = (char *) strsave(title);
strcpy(title, "quantity");
type[0] = (char *) strsave(title);
strcpy(title, "quality");
type[1] = (char *) strsave(title);
type[2] =(char *) strsave(title);

strcpy(title, "time_of_day");
transtable[0] = (char *) strsave(title);
strcpy(title, "-");
transtable[1] = (char *) strsave(title);
strcpy(title, "class");
transtable[2] = (char *) strsave(title);

strcpy(title, "time");
transvar[0] = (char *) strsave(title);
strcpy(title, "-");
transvar[1] = (char *) strsave(title);
strcpy(title, "substance");
transvar[2] = (char *) strsave(title);

strcpy(or_clause, " or ");
strcpy(and_clause, " and ") ;

strcpy(blank, "");

strcpy(title, "a");
designator[0] = (char *) strsave(title);
strcpy(title, "b");
designator[1] = (char *) strsave(title);
strcpy(title, "c");
designator[2] = (char *) strsave(title);
strcpy(title, "d");
designator[3] = (char *) strsave(title);
strcpy(title, "e");
designator[4] = (char *) strsave(title);
```

```
/* ********************************************************** */

/* Begin the module... */
{IIingres("idea",0);}
                                        /* tables.   */
switch(num_criteria)
  {
  case 5:
    if(strcmp("-", stripped(transtable[4]))) /* If NOT a "-" */
      {
        IIwrite("range of e=");
        IIwrite(transtable[4]);
        IIwrite("");
        IIsync("decompose.q",146);
      }
    break;
  case 4:
    if(strcmp("-", stripped(transtable[3]))) /* If NOT a "-" */
      {
        IIwrite("range of d=");
        IIwrite(transtable[3]);
        IIwrite("");
        IIsync("decompose.q",151);
      }
    break;
  case 3:
    if(strcmp("-", stripped(transtable[2]))) /* If NOT a "-" */
      {
        IIwrite("range of c=");
        IIwrite(transtable[2]);
        IIwrite("");
        IIsync("decompose.q",156);
      }
    break;
  case 2:
    if(strcmp("-", stripped(transtable[1]))) /* If NOT a "-" */
      {
        IIwrite("range of b=");
        IIwrite(transtable[1]);
        IIwrite("");
        IIsync("decompose.q",161);
      }
    break;
  case 1:
    if(strcmp("-", stripped(transtable[0]))) /* If NOT a "-" */
      {
        IIwrite("range of a=");
        IIwrite(transtable[0]);
        IIwrite("");
        IIsync("decompose.q",166);
      }

    IIwrite("range of x=initialdata");
    IIsync("decompose.q",169);
    IIwrite("range of y=cluster");
    IIsync("decompose.q",170);
    IIwrite("range of z=cluster");
    IIsync("decompose.q",171);
    break;
  }

            /* Make Where-clause to retrieve orig-dest arc data */

strcpy(where_clause, blank);
strcpy(holder, blank);
sprintf(holder,
```

```
        "x.origin = y.id and y.groupwith = \"%s\"", stripped(orig));
strcat(where_clause, holder);
strcpy(holder, blank);
sprintf(holder,
        " and x.destination = z.id and z.groupwith = \"%s\"",
        stripped(dest));
strcat(where_clause, holder);


strcpy(holder, blank);

          /* Now, modify Where-clause for each selected criterium */

for(count_crit = 0; count_crit < num_criteria; count_crit++)
  {
                    /* Count how many options in this criterium on */
   sum_selects = 0;
   for(count_sels = 0; count_sels < num_selections[count_crit];
        count_sels++)
     {
      if(select_on[ count_crit ][ count_sels ] == 1)
        sum_selects++;
     }
/* If not ALL selected nor none selected - */
/* need to expand the Where-clause...      */
if(sum_selects > 0  &&  sum_selects < num_selections[count_crit])
  {
    strcpy(holder, blank);
    OR_FLAG = 0;
    for(count_sels = 0; count_sels < num_selections[count_crit];
         count_sels++)
      {
       if(select_on[count_crit][count_sels] == 1)
         {
          /* found a selected Criterium, append */
          /* relation to Where-clause           */
          if(OR_FLAG)
            strcat(holder, or_clause);
          strcat(holder,
                (strcmp("-",
                         stripped(transvar[count_crit]))) ?
                 stripped(designator[ count_crit ]) : "x");
          strcat(holder, ".");
          strcat(holder, stripped(criteria[count_crit]));
          strcat(holder, "=\"");
          strcat(holder,
                 stripped(selection[count_crit][count_sels]));
          strcat(holder, "\"");
          OR_FLAG = 1;
         }
      }

   /* "AND" this(holder-clause) */
   /* to the Where-clause.....    */
   strcat(where_clause, and_clause);
   strcat(where_clause, "(");
   strcat(where_clause, holder);
   strcat(where_clause, ")");

      if(strcmp("-", stripped(transvar[count_crit]))) /* If NOT "-" */
        {              /*  Ingres JOIN command to decompose     */
                       /* the fuzed categories, using the       */
                       /* translation table (transvar),         */
                       /* translation variable (transvar),      */
                       /* and a flag for a table-lookup         */
```

```
                /* (quality), or value-lookup (quantity)*/
          strcpy (holder, blank);
          if(strcmp(stripped(type[count_crit]), "quality") == 0)
            /* IS a "quality" function translation */
             sprintf(holder, "x.%s = %s.%s",
                     stripped(transvar[count_crit]),
                     stripped(designator[ count_crit ]),
                     stripped(transvar[count_crit]));

         else         /* IS a "quantity" function translation */
           sprintf(holder,
                   "x.%s >= %s.minval and x.%s <= %s.maxval",
                   stripped(transvar[count_crit]),
                   stripped(designator[ count_crit ]),
                   stripped(transvar[count_crit]),
                   stripped(designator[ count_crit ]));
          strcat(where_clause, and_clause);
         strcat(where_clause, holder);
        }
     }
   /* Loop through all criteria */
 }

/* DEBUG */
printf("Ingres \"Where Clause\", based on criteria:\n%s\n\n\n",
       where_clause);
printf("             Records retieved from initial data:\n\n");
/* DEBUG */
                                          /* Set up arguments array ...  */
strcpy(title, "                  ");
arguments[0] = (char *)  strsave(title);
arguments[1] = (char *)  strsave(title);
arguments[2] = (char *)  strsave(title);
arguments[3] = (char *)  strsave(title);
arguments[4] = (char *)  strsave(title);
arguments[5] = (char *)  strsave(title);
arguments[6] = (char *)  strsave(title);
arguments[7] = (char *)  strsave(title);
arguments[8] = (char *)  strsave(title);
arguments[9] = (char *)  strsave(title);
/* Whew! Make the call to Ingres. */

if(strlen(where_clause) > 255)
  {
    /* Next line is a legal ANSI C statement. */
    fprintf(fp,
            "\n\n\n\n\n   Search strategy too complex;"
            "please simplify.\n");
    /* Next line is a legal ANSI C statement. */
    printf("\n\n\n\n\n    Search strategy too complex;"
           "please simplify.\n");
    fclose(fp);
    IIexit();
    return;
  }

/* The parameterized format string could be constructed by Ingres  */
IIwrite("retrieve(");
/* Next line is a legal ANSI C statement. */
IIw_left("%c=x.origin,%c=x.destination,%c=ascii(x.amount),"
         "%c=x.substance,%c=x.mode,%c=ascii(x.time)",
         arguments);
IIwrite(")where ");
IIwrite(where_clause);
IIsetup();
```

```
while(IIgettup("decompose.q",296))
  {
    /* tables, or issue MSG to user....      */
    /*  OK, now I got the values as strings in arguments[]
        coming out one record at a time ...    */
    /* DEBUG */
    sscanf(arguments[5], "%d", &hourcount);
    /* Next printf is a legal ANSI-C statement. */
    printf("ORG: %s    DEST: %s    Amount: %s\nSubstance: %s"
          "Via: %s  Apprehended at %04d hrs.\n",
          arguments[0], arguments[1], arguments[2],
          arguments[3], arguments[4], hourcount);

    fprintf(fp, /* This is a legal ANSI-C statement. */
          "ORG: %s    DEST: %s    Amount: %s\nSubstance: %s"
          "Via: %s  Apprehended at %04d hrs.\n\n",
          arguments[0], arguments[1], arguments[2],
          arguments[3], arguments[4], hourcount);
    /* DEBUG */
  }
IIflushtup("decompose.q",315);
IIexit();
fclose(fp);
} /* End decompose(). */
```

What is claimed is:

1. In a computer system, including a display device, and to which is available a database of data comprising a plurality of records of transportings of various items, each record having a plurality of fields including fields for destination, origin, quantity of item, and name of item, each field containing an entry that is one of one or more possible entries in such field, each record therefore comprising a plurality of entries, each entry in each field being a member of a corresponding one of a plurality of different classes, a method of aiding a computer operator in visually ascertaining patterns of transporting, the method comprising:

translating the name of item entry in each field into one of the classes in said field;

creating from the available database a fused database of fused records, each fused record including fields for origin, destination, quantity and class, said fused database containing sufficient information for displaying an abstraction on said display device; and displaying on said display device a graphic abstraction representing fused data which meet criteria selected by the operator, said abstraction comprising (i) a geographic map, (ii) a network of nodes and arcs representing origin-destination pairs in the database whose associated entries meet the selected criteria, at least one of said displayed origin-destination paris having an indication of item quantity total for transportings therebetween which meet said selected criteria.

2. The method as defined in claim 1 including the step of displaying, upon operator request, the quantities of items, according to class, which make up the total for a displayed origin-destination pair about which the operator wishes to know more.

3. The method as defined in claim 2 including the step of displaying, upon operator request, all records, in the available database, which contribute to a displayed origin-destination pair about which the operator wishes to know more.

4. The method as defined in claim 1 including the step of displaying, upon operator request, the quantities of items, according to class, which make up the total for a displayed origin-destination pair about which the operator wishes to know more.

5. The method as defined in claim 4 including the step of displaying, upon operator request, all records, in the available database, which contribute to a displayed origin-destination pair about which the operator wishes to know more. 1

6. The method as defined in claim 1 including the step of displaying, upon operator request, all records, in the available database, which contribute to a displayed origin-destination pair about which the operator wishes to know more.

7. The method as defined in claim 1 including the step of displaying, upon operator request, all records, in the available database, which contribute to a displayed origin-destination pair about which the operator wishes to know more.

8. The method as defined in claim 1 further including a field for times of transporting.

9. The method as defined in claim 1 wherein, as a result of clustering, the number of different origins and destinations in the fuzed database is less than the number of different origins and destinations in the available database.

10. The method as defined in claim 1 wherein, as a result of clustering, the number of different origins and destinations in the fuzed database is less than the number of different origins and destinations in the available database.

11. Method for visually presenting patterns in data representing past transportings of various items among multiple locations, comprising the steps of:

gathering a multiplicity of alphanumeric data elements in categories relating to the origin, destination, and at least one other descriptor for each item transported;

processing said data elements by fusing a plurality thereof in at least one of the categories into one or more general data classes according to selectable affinity criteria; and displaying a geographic representation of said processed data classes, whereby patterns in movement of said items may be discerned.

12. Method for visually presenting patterns in data representing transportation of items among multiple locations as described in claim 11 wherein said displaying step comprises the steps of:

displaying nodes representative of origins and destinations of transportings;

displaying an arc connecting the origins and destinations to represent such transportings; and displaying adjacent the arc information representative of data classes formed from said at least one other descriptor.

13. Method for visually presenting patterns in data representing transportation of items among multiple locations as described in claim 12 further including the step of displaying the aggregate data associated with each node-arc pair when a particular node-arc pair is designated.

14. Method for visually presenting patterns in data representing transportation of items among multiple locations as described in claim 13 wherein said categories representing at least one other descriptor includes identity of said item.

15. Method for visually presenting patterns in data representing transportation of items among multiple locations as described in claim 14 wherein said categories of data elements further include time of said transporting of said item.

16. Method for visually presenting patterns in data representing transportation of items among multiple locations as described in claim 15 wherein said categories of data elements further include mode of said transporting of said item.

17. Method for visually presenting patterns in data representing transportation of items among multiple locations as described in claim 11 further including changing at least one of said affinity criteria and repeating the processing and displaying steps.

* * * * *